US011527044B2

(12) United States Patent
Kocharlakota et al.

(10) Patent No.: US 11,527,044 B2
(45) Date of Patent: Dec. 13, 2022

(54) SYSTEM AND METHOD FOR AUGMENTED REALITY

(71) Applicant: Samsung Electronics Co., Ltd., Suwon-si (KR)

(72) Inventors: Sridhar Kocharlakota, Fremont, CA (US); Moiz Sonasath, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/274,054

(22) Filed: Feb. 12, 2019

(65) Prior Publication Data

US 2020/0005542 A1 Jan. 2, 2020

Related U.S. Application Data

(60) Provisional application No. 62/690,813, filed on Jun. 27, 2018.

(51) Int. Cl.
*G06T 19/00* (2011.01)
*G06T 7/70* (2017.01)
(Continued)

(52) U.S. Cl.
CPC .......... *G06T 19/006* (2013.01); *G06F 3/011* (2013.01); *G06T 7/70* (2017.01); *G06T 17/00* (2013.01)

(58) Field of Classification Search
CPC ......... G06T 19/006; G06T 7/70; G06T 17/00; G06T 7/007; G06F 3/011; G06F 3/0304;
(Continued)

(56) References Cited

U.S. PATENT DOCUMENTS 9,318,151 B2   4/2016 Lee et al.
9,495,783 B1 * 11/2016 Samarasekera ......... G06T 11/60
(Continued)

FOREIGN PATENT DOCUMENTS

KR        10-1687612 B1   12/2016
KR     10-20170073985 A    6/2017
KR        10-1781849 B1    9/2017

OTHER PUBLICATIONS

International Search Report dated Oct. 10, 2019 in connection with International Patent Application No. PCT/KR2019/007720, 3 pages.

(Continued)

*Primary Examiner* — Chante E Harrison

(57) ABSTRACT

A method for providing a personalized augmented reality (AR) display includes obtaining, at an augmented reality apparatus, image data of a camera field of view, the camera field of view covering a field of view of an externally oriented camera of the augmented reality apparatus, identifying a first object in the camera field of view based on the image data, and mapping a position of the first object relative to an augmented reality (AR) field of view. The method further includes determining, based on the identity of the first object, whether the first object is an augmentation target, and responsive to determining that the first object is the augmentation target, displaying, on the internally-facing display, an item of AR content associated with the augmentation target in the AR field of view.

20 Claims, 21 Drawing Sheets

(51) Int. Cl.
*G06F 3/01* (2006.01)
*G06T 17/00* (2006.01)

(58) Field of Classification Search
CPC .............. G06F 3/0346; G06F 3/04815; G06K 9/00671; G02B 2027/0138; G02B 2027/0141; G02B 27/0172
See application file for complete search history.

(56) References Cited

U.S. PATENT DOCUMENTS

| | | | |
|---|---|---|---|
| 9,710,969 B2 | 7/2017 | Malamud et al. | |
| 2010/0315418 A1 | 12/2010 | Woo | |
| 2012/0001901 A1 | 1/2012 | Park | |
| 2012/0019557 A1* | 1/2012 | Aronsson | G06T 11/00 345/633 |
| 2012/0038668 A1 | 2/2012 | Kim et al. | |
| 2012/0092372 A1 | 4/2012 | Ryu et al. | |
| 2015/0032838 A1* | 1/2015 | Demsey | G06F 16/9574 709/213 |
| 2015/0062120 A1 | 3/2015 | Reisner-Kollmann et al. | |
| 2015/0091942 A1* | 4/2015 | Ko | G06T 19/006 345/633 |
| 2015/0195626 A1* | 7/2015 | Lee | H04N 21/23418 725/34 |
| 2015/0317837 A1 | 11/2015 | Sholudko et al. | |
| 2016/0026253 A1 | 1/2016 | Bradski et al. | |
| 2016/0086384 A1 | 3/2016 | Stroila | |
| 2016/0180602 A1* | 6/2016 | Fuchs | G06F 3/012 463/31 |
| 2017/0084082 A1* | 3/2017 | McTaggart | H04L 67/04 |
| 2018/0088746 A1 | 3/2018 | Cheung et al. | |
| 2018/0150892 A1* | 5/2018 | Waldron | G06Q 30/0623 |
| 2019/0089898 A1* | 3/2019 | Kim | G06K 9/00671 |
| 2019/0215424 A1* | 7/2019 | Adato | G06F 16/23 |
| 2019/0259212 A1* | 8/2019 | Kamal | H04N 9/3185 |
| 2019/0272029 A1* | 9/2019 | Fein | G06F 3/011 |
| 2019/0285896 A1* | 9/2019 | Kobayashi | G06F 3/0304 |
| 2019/0371067 A1* | 12/2019 | Simari | G06T 19/20 |
| 2019/0392216 A1* | 12/2019 | McPeters | G06T 7/70 |
| 2020/0074740 A1* | 3/2020 | Singh | G06T 19/20 |

OTHER PUBLICATIONS

Written Opinion of the International Searching Authority dated Oct. 10, 2019 in connection with International Patent Application No. PCT/KR2019/007720, 5 pages.
Communication Pursuant to Article 94(3) EPC in connection with counterpart European Patent Application No. 19825873.3 dated Mar. 1, 2022, 8 pages.
Third Office Action dated Aug. 23, 2022 in connection with counterpart Chinese Application No. 201980038175.2, 26 pages.
Songzhiet et al., "Pedestrian Detection: Theory and Practice," Xiamen University Press, Mar. 2016, 17 pages (See translation of Third Office Action on pp. 6-7, 11, and 13 for explanation of relevance).

* cited by examiner

FIG. 6

| Object Signature 605 | User ID 610 | Augmentation Data 615 | Visibility 620 | Object Location 625 | Expiration Time 630 |
|---|---|---|---|---|---|
| 1 (607) | John | Text, Web Content Item (617) | Martha (619) | {GPS Coordinates / Indoor} (627) | Until Read (631) |
| 2 (635) | Martha | Virtual Object (609) | John, Ted | Any place (629) | 6:00 a.m. – 6:00 p.m. (633) |
| 3 | Ted | Video | Anyone | {GPS Coordinates / Indoor} | Indefinite |

600

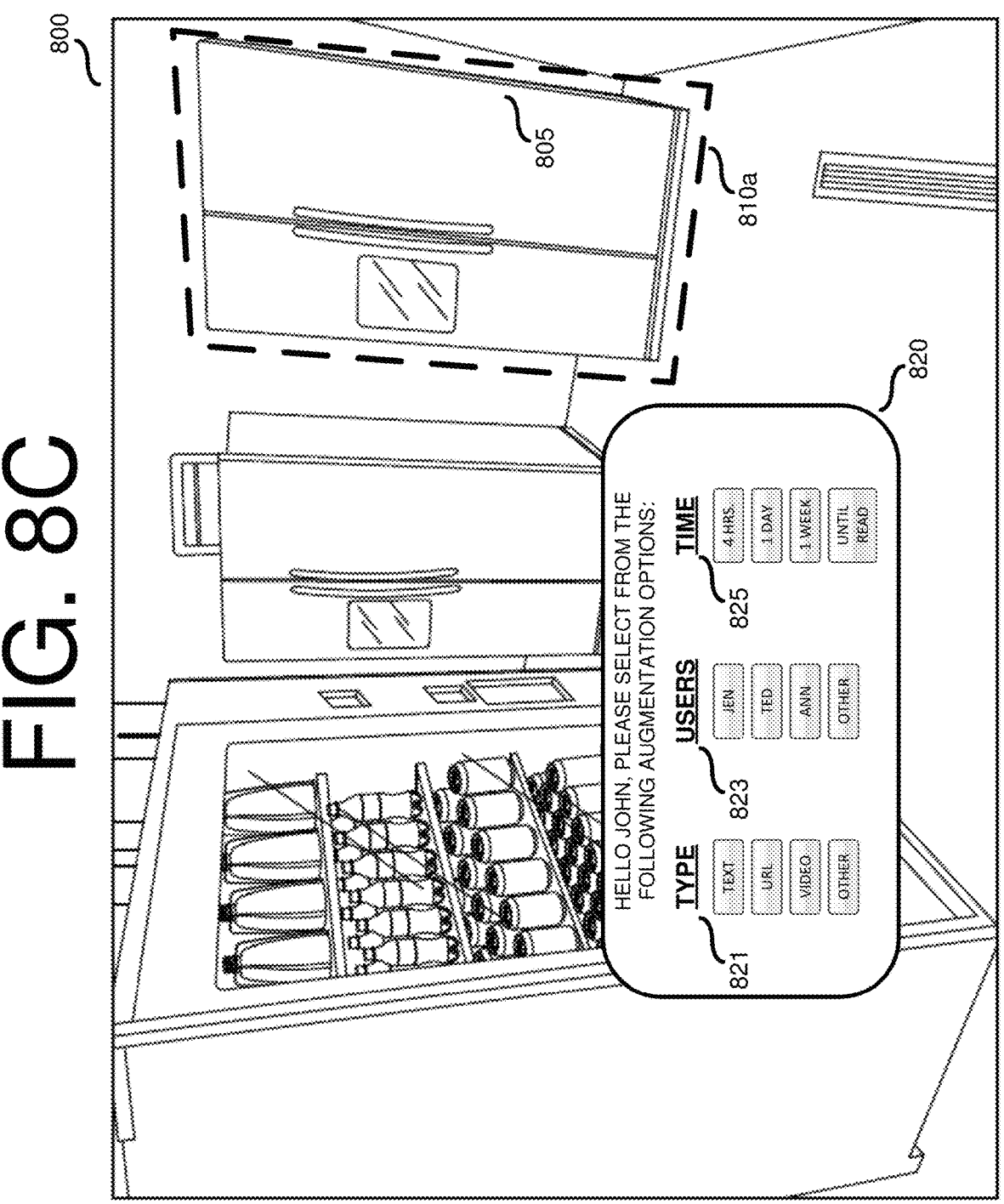

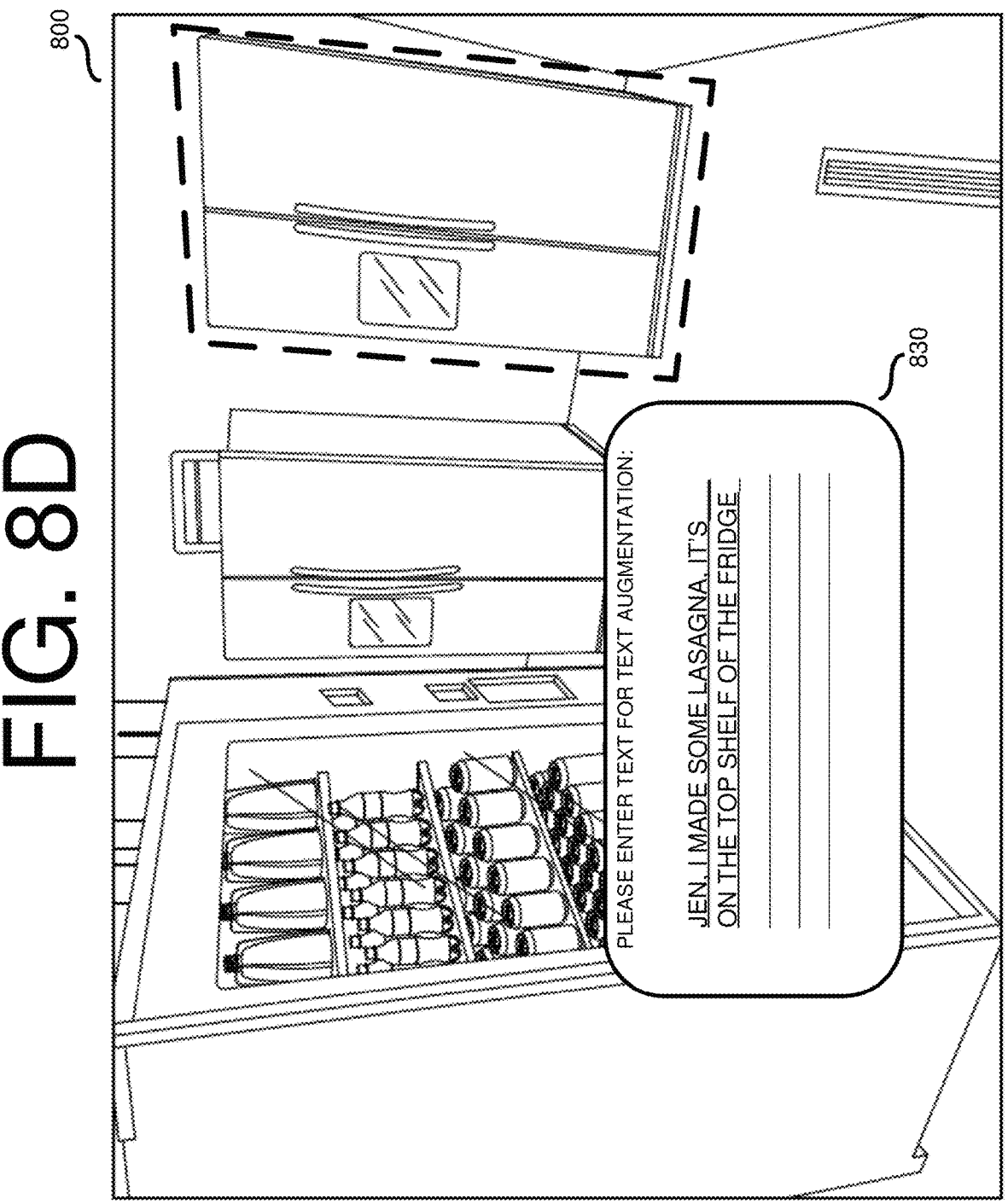

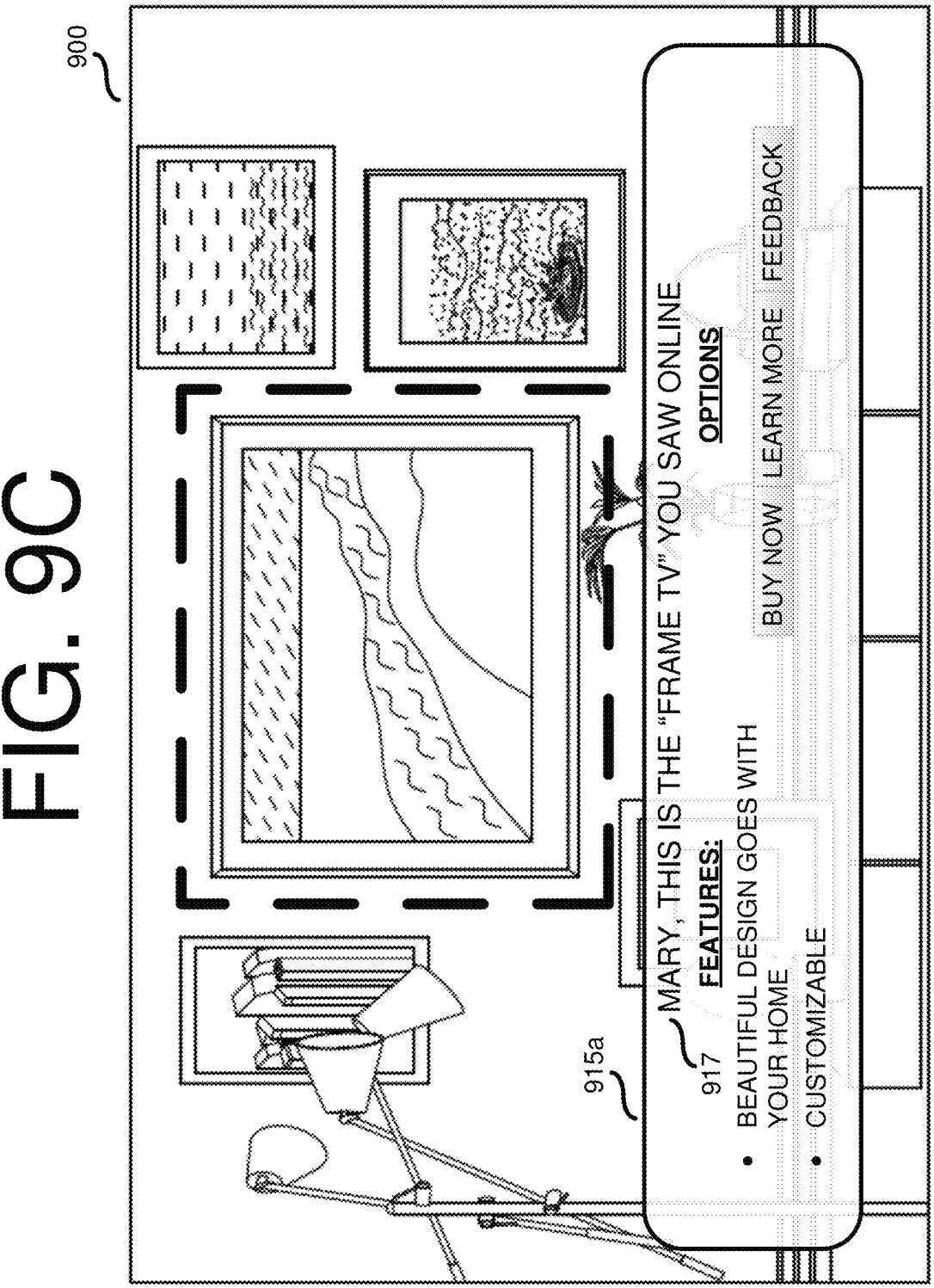

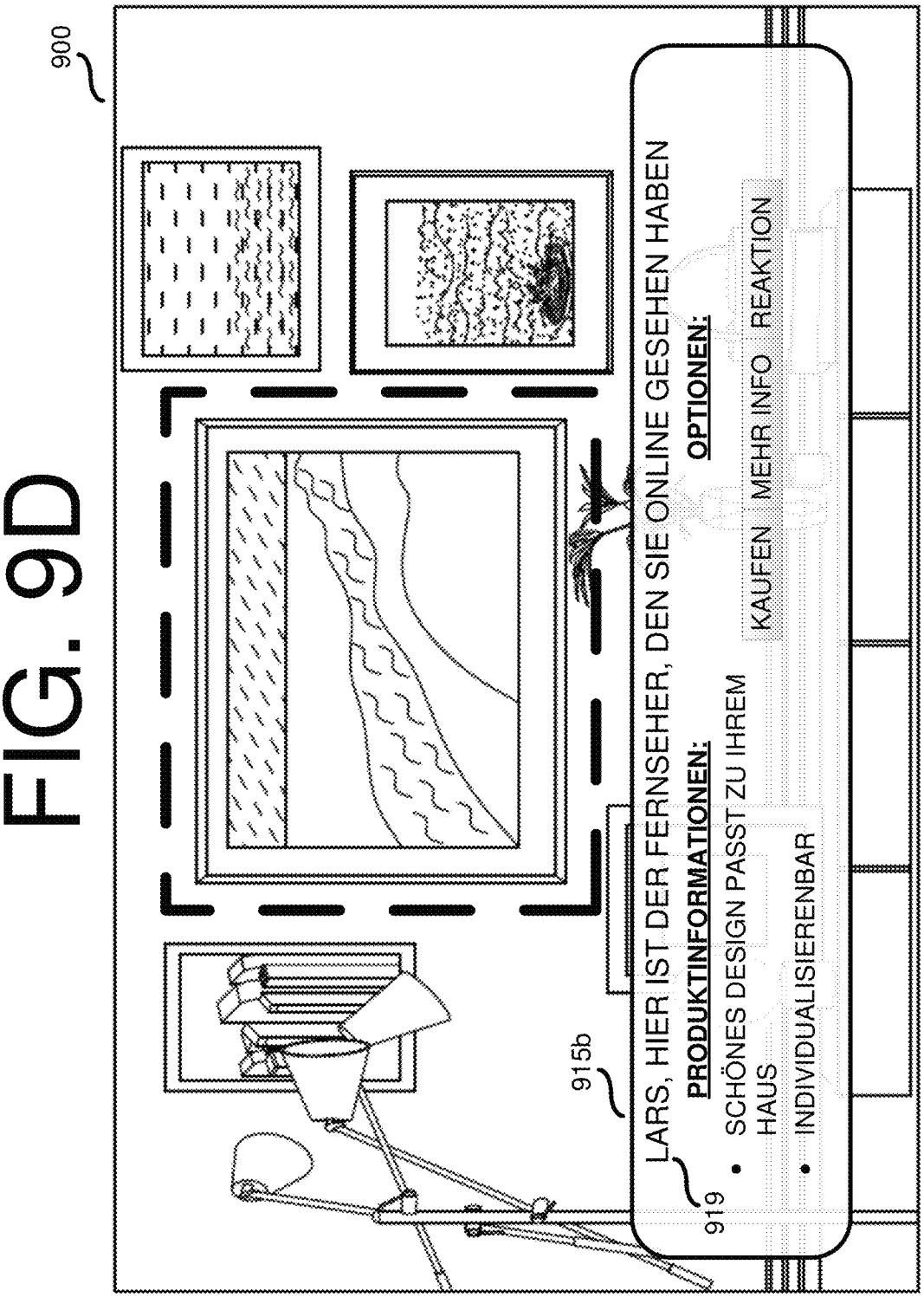

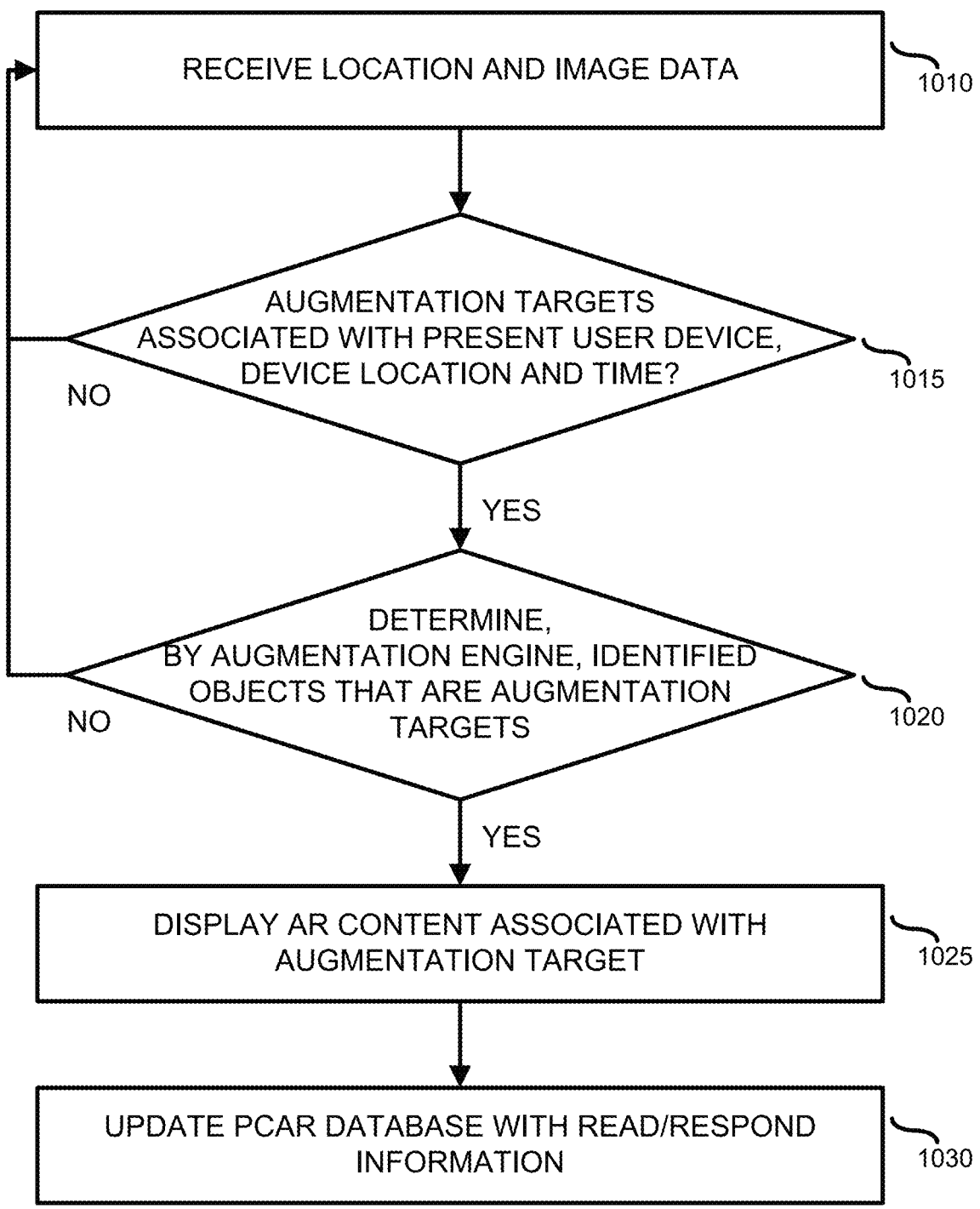

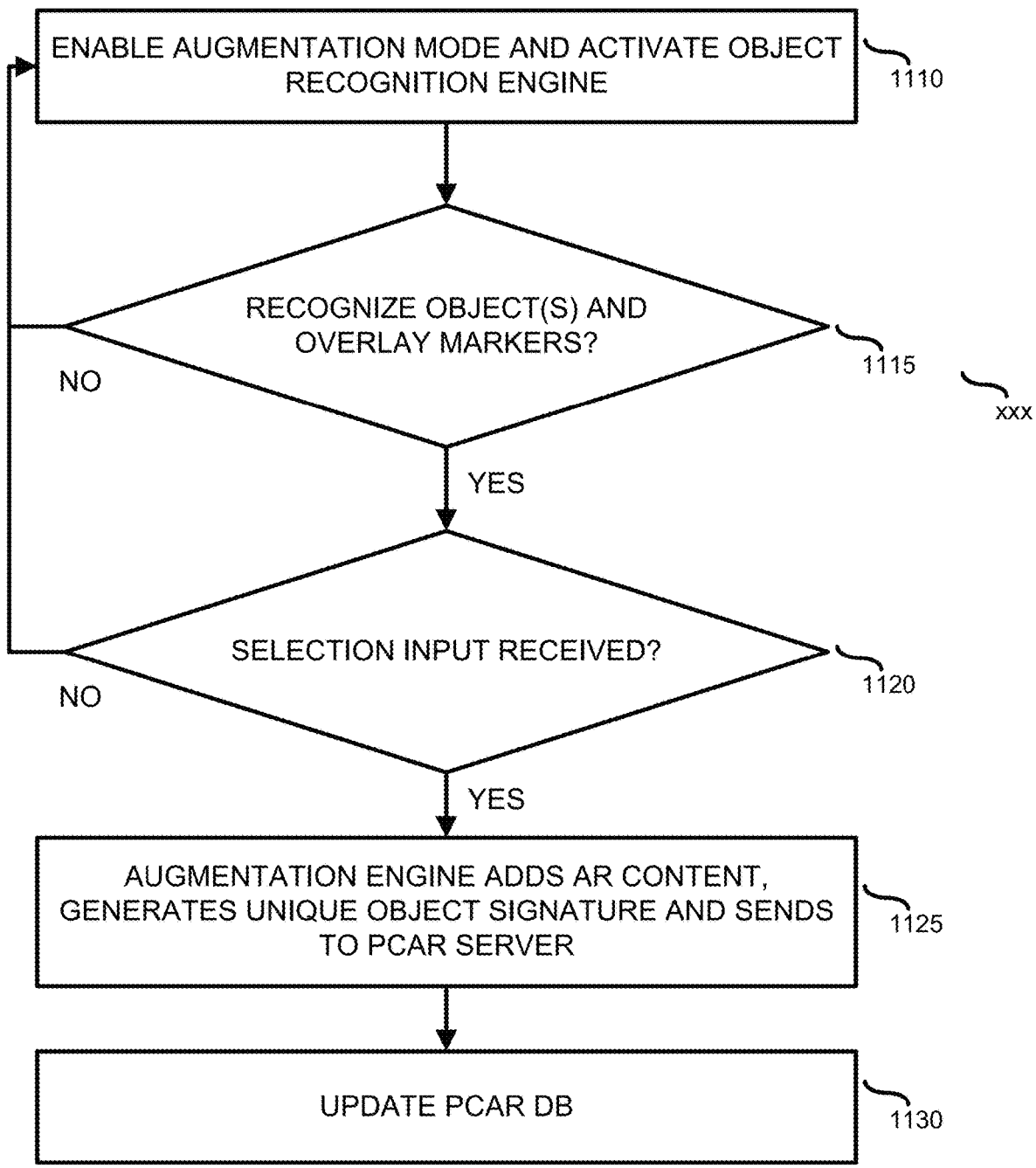

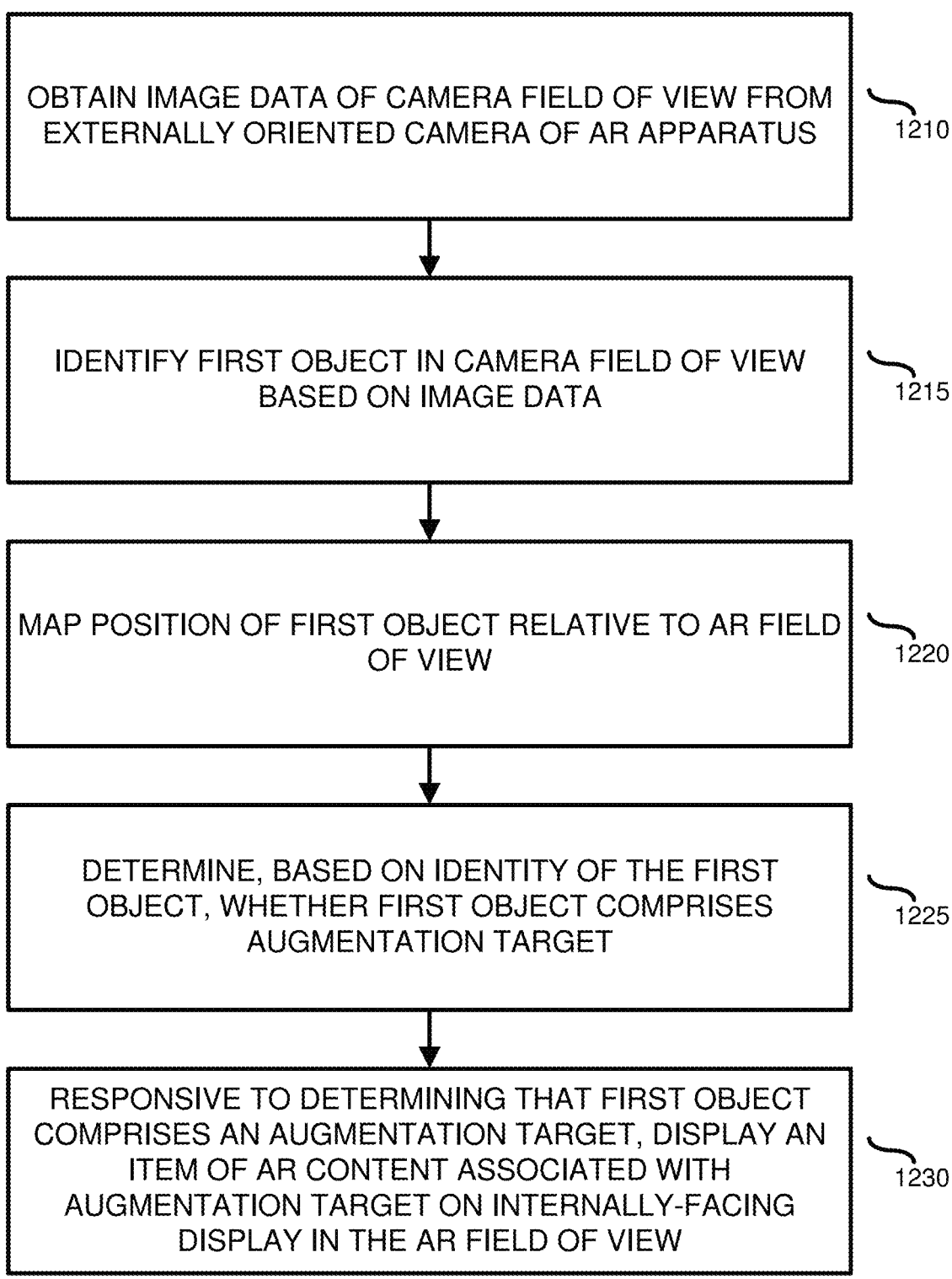

SYSTEM AND METHOD FOR AUGMENTED REALITY

CROSS-REFERENCE TO RELATED APPLICATION AND CLAIM OF PRIORITY

This application claims priority under 35 U.S.C. § 119(e) to U.S. Provisional Patent Application No. 62/690,813 filed on Jun. 27, 2018. The above-identified provisional patent application is hereby incorporated by reference in its entirety.

TECHNICAL FIELD

This disclosure relates generally to communication technology. More specifically, this disclosure relates to a system and method for augmented reality.

BACKGROUND

Portable networked devices with displays, such as tablets and smartphones have, within the course of little over a decade, gone from being luxury items to supplanting desktop computers, fax machines and landline telephones as the default device for personal and business communications. The smartphone's dominance as the primary communication interface for millions of people is reflected by the frequency with which many users check their devices and the steady rise in screen time among users.

In addition to the emergence of portable networked devices as a dominant communication medium, the past decade has also witnessed the emergence of new display technologies, including virtual reality (VR) and augmented reality (AR), which harness the possibilities of small form processors and lightweight displays to provide displays which supplant or augment the feed of visual information to viewers' eyes from the physical world.

The ubiquity of portable devices, such as smartphones and the emergence of new display technologies, such as AR and VR present numerous opportunities and technological challenges associated with improving the functionality of smartphones and other portable devices as tools for communication by incorporating AR and VR technologies.

SUMMARY

This disclosure provides a system and method for augmented reality.

In a first embodiment, a method for providing a personalized augmented reality (AR) display includes obtaining, at an augmented reality apparatus, image data of a camera field of view, the camera field of view covering a field of view of an externally oriented camera of the augmented reality apparatus, identifying a first object in the camera field of view based on the image data, and mapping a position of the first object relative to an augmented reality (AR) field of view, the AR field of view covering a portion of the camera field of view in which augmented reality (AR) content can be displayed on an internally-facing display of the augmented reality apparatus. The method further includes determining, based on the identity of the first object, whether the first object is an augmentation target, and responsive to determining that the first object is the augmentation target, displaying, on the internally-facing display, an item of AR content associated with the augmentation target in the AR field of view.

In a second embodiment, an augmented reality apparatus includes an externally oriented camera covering a camera field of view, the camera field of view including a field of view of the externally oriented camera, an internally-facing display providing an augmented reality (AR) field of view, the AR field of view including a portion of the camera field of view in which AR content can be displayed on the internally-facing display of the augmented reality apparatus, a processor and a memory containing instructions, which when executed by the processor, cause the processor to implement a personalized communication augmented reality (PCAR) framework. The PCAR is configured to obtain image data of the camera field of view, identify a first object in the camera field of view based on the image data, map a position of the first object in the camera field of view relative to the AR field of view, determine, based on the identity of the first object, whether the first object is an augmentation target, and responsive to determining that the first object is the augmentation target, display, on the internally-facing display, an item of AR content associated with the augmentation target in the AR field of view.

In a third embodiment, a non-transitory computer-readable medium includes program code, which when executed by a processor, causes an augmented reality apparatus to obtain image data of a camera field of view, the camera field of view including a field of view of an externally oriented camera of the augmented reality apparatus, identify a first object in the camera field of view based on the image data, and map a position of the first object relative to an augmented reality (AR) field of view, the AR field of view in a portion of the camera field of view in which augmented reality (AR) content can be displayed on an internally-facing display of the augmented reality apparatus. The non-transitory computer-readable medium further includes program code, which when executed by the processor, causes the augmented reality apparatus to determine, based on the identity of the first object, whether the first object is an augmentation target, and responsive to determining that the first object is the augmentation target, display, on the internally-facing display, an item of AR content associated with the augmentation target in the AR field of view.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 6 illustrates an example of a PCAR database schema according to certain embodiments of this disclosure;

FIGS. 8A, 8B, 8C, 8D, 8E, and 8F illustrate aspects of augmented reality-based communication according to certain embodiments of this disclosure;

FIGS. 9A, 9B, 9C, and 9D illustrate aspects of augmented reality-based communication according to various embodiments of this disclosure;

FIG. 10 illustrates operations of a method of operating a PCAR framework in a normal mode, according to some embodiments of this disclosure;

FIG. 11 illustrates operations of a method of operating a PCAR framework in an augmentation mode, according to at least one embodiment of this disclosure;

FIG. 12 illustrates operations of a method for performing augmented reality-based communications according to certain embodiments of this disclosure.

DETAILED DESCRIPTION

FIGS. 1 through 13, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
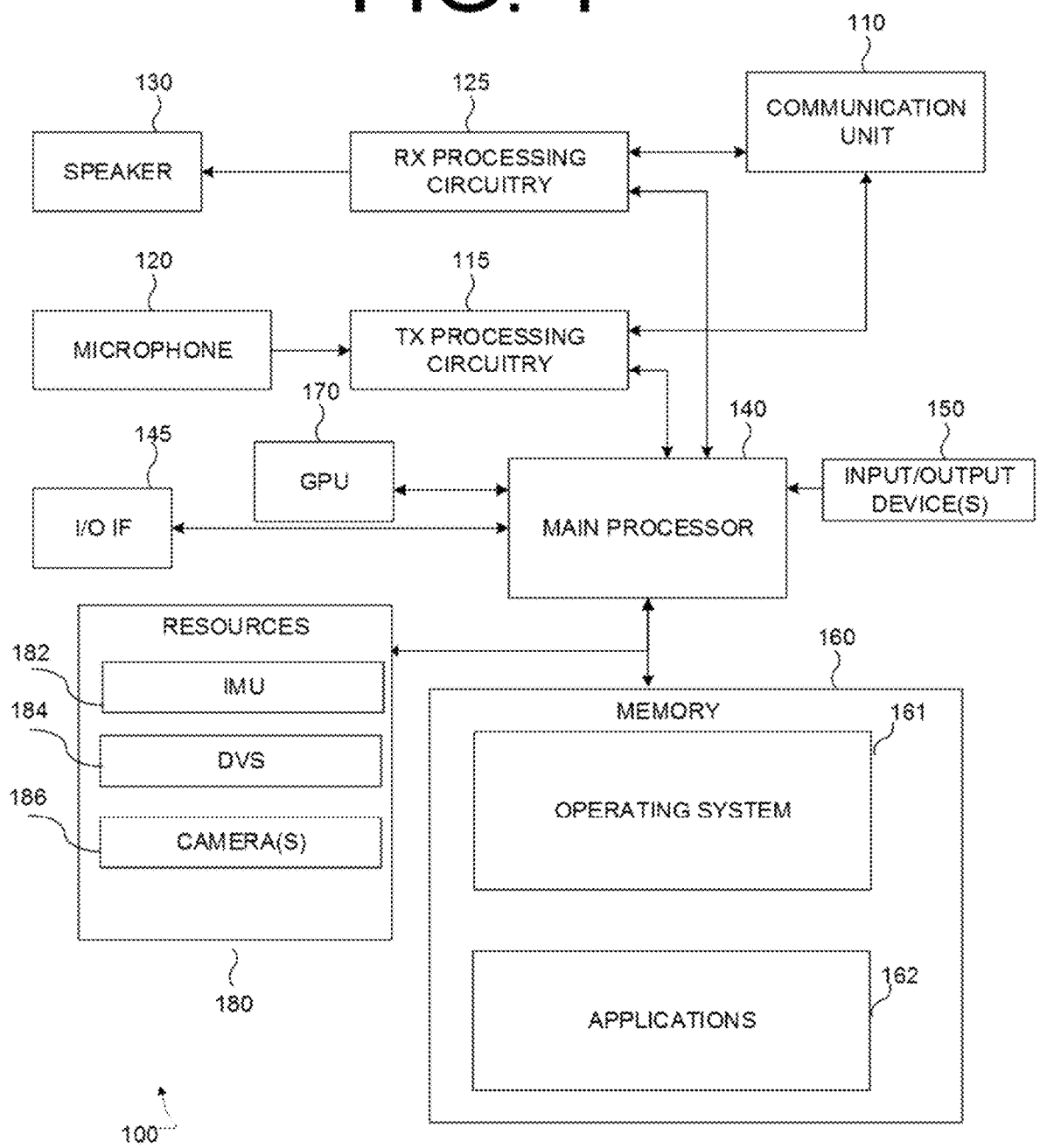
FIG. 1 illustrates an example of an electronic device for implementing systems and methods for augmented reality according to certain embodiments of this disclosure.

FIG. 1 illustrates a non-limiting example of a device for augmented reality-based communication according to some embodiments of this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device. For example, device 100 may be implemented, without limitation, as a smartphone, a wearable smart device (such as a smart watch), a tablet computer, or as a head-mounted display.

As shown in the non-limiting example of FIG. 1, the device 100 includes a communication unit 110 that may include, for example, a radio frequency (RF) transceiver, a BLUETOOTH® transceiver, or a WI-FI® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 include applications which can consume image data from physical objects in a field of view of a camera of electronic device 100 and provide AR or VR content through a display of device 100, or a display of a separate device.

The communication unit 110 may receive an incoming RF signal, for example, a near field communication signal such as a BLUETOOTH® or WI-FI™ signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, head mounted displays (HMD), touch screens, mouse(s), track balls or other devices capable of acting as a user interface to allow a user to interact with electronic device 100. In some embodiments, input/output device(s) 150 can include a touch panel, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, electronic device 100 includes a variety of additional resources 180 which can, if permitted, be accessed by applications 162. According to certain embodiments, additional resources 180 include an accelerometer or inertial motion unit 182, which can detect movements of the electronic device along one or more degrees of freedom. Additional resources 180 include, in some embodiments, a dynamic vision sensor (DVS) 184, one or more cameras 186 of electronic device 100.

Although FIG. 1 illustrates one example of a device 100 for performing semi-dense depth estimation, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
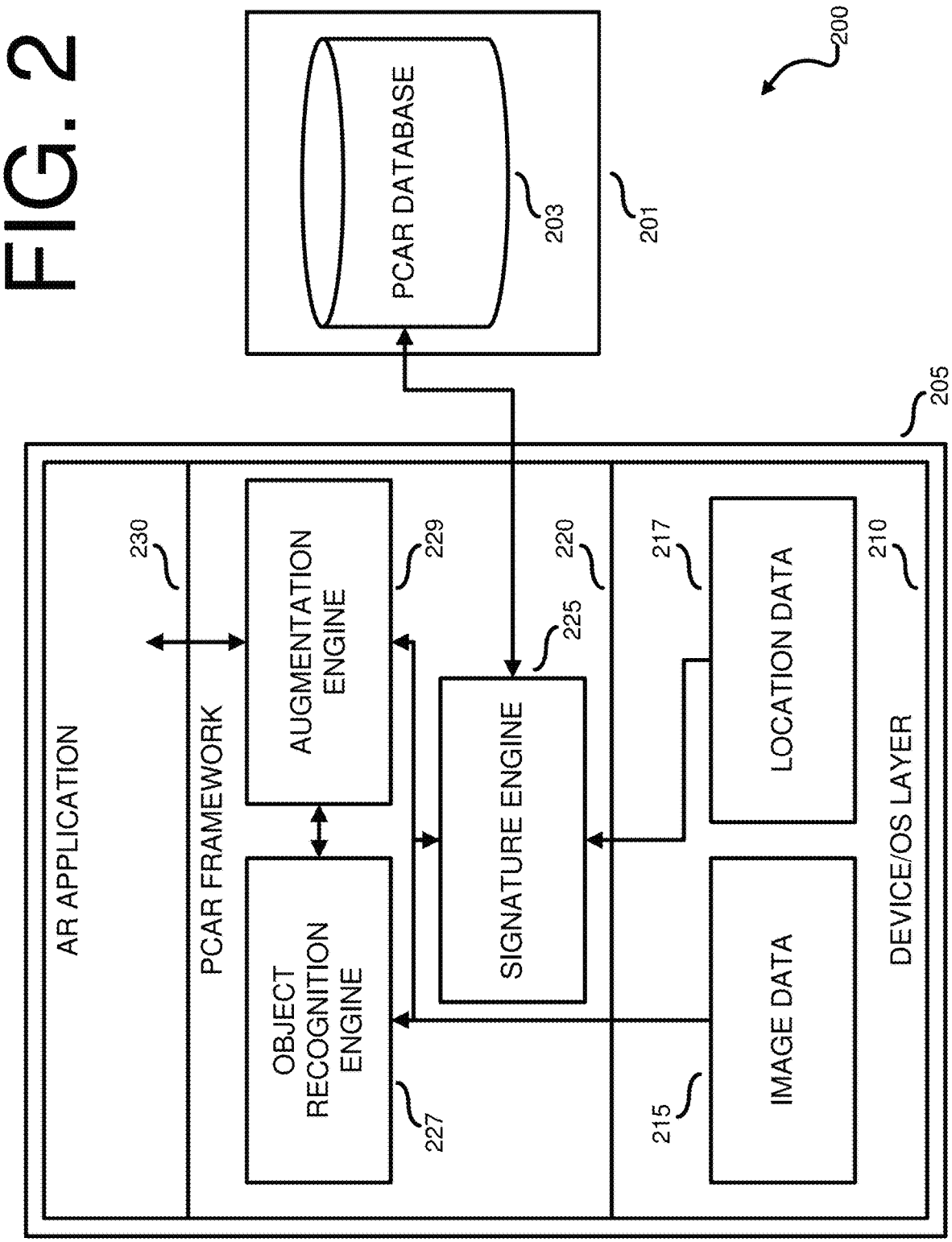
FIG. 2 illustrates an example of an architecture incorporating a personalized communication augmented reality (PCAR) framework according to some embodiments of this disclosure.

FIG. 2 illustrates an example of an architecture 200 incorporating a personalized communication augmented reality (PCAR) framework according to some embodiments of this disclosure. The embodiment of the architecture 200 shown in FIG. 2 is for illustration only and other embodiments could be used without departing from the scope of the present disclosure.

For ease of explanation, in the non-limiting example of FIG. 2, architecture 200 adheres to a client-host model between host platform 201 and client platform 205, with the components of a PCAR framework 220 implemented as software on a logical layer between an AR application layer 230 and an OS/device layer 210. Other embodiments, such as embodiments utilizing a peer-to-peer relationship (as opposed to a host-client) between entities, or where the components of PCAR framework 220 are implemented as hardware, or a combination of hardware and software, are possible and within the contemplated scope of this disclosure.

According to certain embodiments, host platform 201 comprises a database server, which is communicatively connected (for example, via the internet, a wireless network, or an intranet) to client platform 205. As one non-limiting example, host platform 201 comprises networked computer, such as a database server running an instance of MySQL to host a PCAR database 203.

According to various embodiments, PCAR database 203 comprises, at a minimum, a repository of information associating items of augmented reality (AR) content with identifiers of objects. According to some embodiments, PCAR database 203 also includes data corresponding to a schema comprising object signatures (for example, identifiers of a particular object—for example, a chair at a known location), a user identifier (for example, an ID of a user who created an association between item(s) of AR content and an object, visibility data (for example, data specifying the permissions of other user to view the AR content whose association was created by a user identified in the user identifier field, object location, and the expiration time of the association between the item of AR content and the object.

In certain embodiments, the associations between item(s) of AR content and objects are determined by a user (for example, as shown in FIGS. 8A through 8F of this disclosure). In various embodiments, the logic for creating associations between objects and item(s) of content reside within the AR apparatus itself. As a non-limiting example, a PCAR service running on client platform 205 could use information of the client platform itself (for example, an international mobile equipment identifier (IMEI) associated with client platform, or system information, such as an identifier of the operating system) to create associations between objects (for example, a charger for the device) and item(s) of AR content. As one example, a PCAR service for client platform 205 may receive from a PCAR database 203, information associating an item of AR content provided by a mobile carrier for client platform 205 with an object. As an example, an item of AR content comprising an advertisement for an upgraded mobile service plan may be presented when the client platform 205 receives image data associated with the charger or power supply for client platform 205. In this example, the itemAR content is selected to be associated with the object based on a piece of information regarding the client platform, such as the identity of the wireless carrier to which the client platform is a subscriber.

In various embodiments according to this disclosure, the associations between items of AR content and objects are driven by, and pushed out, by host platform 201 in conjunction with PCAR database 203. Thus, certain embodiments according to this disclosure support communications between client devices (for example, as shown in FIGS. 8A through 8F), as well as end-to-end communications between a host platform 201 and 203. In some embodiments according to this disclosure, host platform 201 receives information (for example, from network access points, such as Wi-Fi routers or ZigBee transceivers) regarding the identity of devices within visual range of an object which is an augmentation target. Based on this information, host platform 201 pushes out association information maintained in PCAR database 203 to some or all of the identified devices. As an illustrative example, the augmentation shown to users in FIGS. 9A through 9D of this disclosure may be selected on device information obtained by host platform 201. As one example, the information regarding the television set shown in FIGS. 9A through 9D might, based on device identity information, only be pushed out to devices manufactured by the maker of the television.

As shown in the non-limiting example of FIG. 2, client platform 205 comprises one or more electronic devices (for example, a head mounted display and a smartphone, or electronic device 100 of FIG. 1) which are communicatively connected to host platform 201. In this illustrative example, on the client side, architecture 200 comprises three logical layers—a device/operating system (OS) layer 210, a middle layer comprising PCAR framework 220, and an AR application layer 230.

In certain embodiments according to this disclosure, device/OS layer 210 comprises the hardware, software or combination of hardware and software of client platform 205 which obtains image data 215 and location data 217.

In some embodiments, image data 215 comprises data output by from one or more externally-oriented sensors (for example, a CMOS video camera or a dynamic vision sensor (DVS), configured to produce a comparatively less data-intensive representation of a field of view by capturing changes in the intensity of received light at the pixels of the sensor). As used in this disclosure, the term "externally-oriented" encompasses directions away from a direction of projection of a display for presenting AR content in an AR apparatus. As a non-limiting example, for an AR device to be worn over a user's eyes, a display in the AR device projecting content towards the user's eyes would be "internally-oriented" or "internally facing," while a camera of the device pointed at the world in front of the user, would be "externally oriented." In some embodiments, the one or more sensors generating image data 215 may be components of an augmented reality apparatus (for example, a headset, "smart glasses" or a smartphone).

In some embodiments, location data 217 comprises positioning data (for example, data assigning a specific geospatial coordinate to a sensor), as well as metadata of a specific location (for example, data associating a particular geospatial location and altitude with a particular room in a building, as well as attributes of the location, such as the presence of IoT devices or other devices with which an AR apparatus can communicate). In the non-limiting example of FIG. 2, location data 217 may be obtained from a GPS sensor, an IMU (for example, IMU 182 in FIG. 1), and a communication unit (for example, communication unit 110 in FIG. 1) for communicating with networked devices at a particular location.

According to various embodiments, data from device/OS layer 210, such as image data 215 and location data 217 are provided to PCAR framework 220.

According to various embodiments, PCAR framework 220 catalyzes improvements in the functionality of certain electronic devices, such as smartphones or devices with head mounted displays, such as "smart glasses," by allowing users to communicate by assigning items of virtual reality or augmented reality content to locations and objects (including, without limitation, native objects) within the physical world. As used in this disclosure, the term "native object" encompasses an object whose form or appearance has not been modified, for example, by affixing a sticker with a QR code, to enhance its recognition and identification in a set of digital image data. As discussed elsewhere herein, embodiments according to the present disclosure facilitate the creation, assignment and management of AR and VR content by AR apparatus users, thereby allowing commonly-used devices, such as smartphones, to operate as platforms for managed AR and VR based communication between users. As such, embodiments as disclosed and claimed, extent the functionality of AR from being a technology merely allowing users of AR apparatus to consume content (for example, by seeing AR content created and selected for a general audience, such as AR content associated with a landmark viewed through an AR apparatus), to being a technology which allows users of AR apparatus to consume, produce, and manage content, thereby allowing AR apparatus to function as a tool for communication.

Referring to the non-limiting example of FIG. 2, PCAR framework 220 comprises signature engine 225, object recognition engine 227, and augmentation engine 229. In this non-limiting example, each of signature engine 225, object recognition engine 227 and augmentation engine 229 are implemented as program code executed by a processor of client platform 205. In certain embodiments, the components of PCAR framework may be implemented as hardware (for example, by an image recognition processor) or across multiple computing platforms (for example, a cloud based platform connected by an API to the client platform 205).

According to certain embodiments, object recognition engine 227 obtains image data from covering a field of view of an externally-oriented camera or other visual sensor (for example, a DVS sensor, such as DVS sensor 184 in FIG. 1) trained on a field of view in which objects which can be recognized as augmentation objects may be found. In certain embodiments, object recognition engine 227 processes the image data to detect features in the image data. According to various embodiments, the object recognition engine 227 performs object recognition using a binary descriptor based object recognition technique, including, for example, the binary robust independent elementary features (BRIEF), binary robust invariant scalable keypoints (BRISK), fast retina keypoints (FREAK), or oriented fast and rotated BRIEF (ORB). According to various embodiments, object recognition engine 227 identifies one or more objects within the field of view of an externally facing sensor (such as an CMOS camera or DVS sensor) and provides a descriptor or other data associated with the identification of the first object to augmentation engine 229 or signature engine 225.

According to various embodiments, signature engine 225 receives descriptors of recognized objects in a field of view (for example, a camera field of view of an AR apparatus operating as client platform 205) from object recognition engine 227. In certain embodiments, object recognition engine 227 operates continuously, and continuously scans image data from a field of view for objects to recognize. According to some embodiments, object recognition engine 227 may, to conserve battery or other resources, suspend or reduce its operation when a threshold condition (for example, it stops recognizing unique objects at a given location) is met. Additionally, in various embodiments, signature engine 225 also receives location data 217 from one or more entities (such as a GPS sensor, or wireless communication unit). According to various embodiments, signature engine 225 generates, for each object associated with a descriptor generated by object recognition engine 227, and location data 217, a signature for the object. In certain embodiments, signature engine 225 generates the signature based on just the descriptor generated by object recognition engine 227. According to various embodiments, the signature may be unique. According to some embodiments, a signature consists of a hash of the descriptor and location. In the non-limiting example of FIG. 2, signature engine 225 periodically performs comparisons of generated signatures against signatures maintained in a PCAR database 203 maintained on host platform 201. According to various embodiments, when a match between a signature at client platform 205 and host platform 201 is determined, signature engine 225 receives augmentation data. According to various embodiments, augmentation data encompasses, at a minimum, data associated with an AR display, the AR display being associated with the object for which a signature match was determined.

In various embodiments according to this disclosure, PCAR framework 220 includes augmentation engine 229. In certain embodiments, augmentation engine 229 supports at least two modes of operation comprising a normal mode, and an augmentation mode. In some embodiments, PCAR framework 220 allows the client platform 205 to simultaneously operate in both normal mode and augmentation mode. In certain embodiments, client platform 205 may operate exclusively in either a normal mode or an augmentation mode. According to the non-limiting example of FIG. 2, in the normal mode, augmentation engine 229 receives augmentation data for objects which have been recognized, and whose signature matches a signature associated with an AR augmentation in PCAR database 203. In certain embodiments, augmentation engine 229 receives outputs from object recognition engine 227, including, for example, data indicating the location of features of the object (for example, corners, legs, etc.) In various embodiments, augmentation engine 229 provides an AR application data comprising, or based on, the augmentation data and the data from object recognition engine 227. In various embodiments according to this disclosure, in normal mode, augmentation engine 229 also receives certain inputs provided through AR application (for example, an input indicating that an item of AR content has been viewed), which are passed through signature engine 225 to PCAR database 203.

Referring to the non-limiting example of FIG. 2, in an augmentation mode, augmentation engine 229 receives inputs from AR application 230 for associating an item of AR content with a recognized object in a field of view of a sensor communicatively connected to client platform 205. In certain embodiments, the augmentation engine formats the received inputs according to a schema of PCAR database 203 into augmentation data, which is further associated with an object signature for the recognized object (for example, a signature generated by signature engine 225) and passed to PCAR database 203.

As shown in the non-limiting example of FIG. 2, in architecture 200, client platform 205 also comprises an AR application 230. According to certain embodiments, AR application 230 provides AR content for display on an internally-facing display of client platform 205 (for example, an AR apparatus communicatively connected to host platform 201). In some embodiments, the internally-facing display of client platform 205 provides an AR field of view, which comprises a portion of a camera field of view of a camera or other sensor providing image data 215. In certain embodiments, the AR field of view is a subset of the camera field of view. In certain embodiments, the AR field of view comprises an area of overlap with the camera field of view. In various embodiments, the AR field of view is co-extensive with the camera field of view. In some embodiments, the camera field of view is a subset of the AR field of view. In certain embodiments, AR application 230 displays both the AR content and a visual identification (for example, a box or callout) around the recognized object that is the augmentation target with which the AR content is associated. According to various embodiments, AR application 230 provides a user interface for assigning AR content to the augmentation target.

Figure 3:
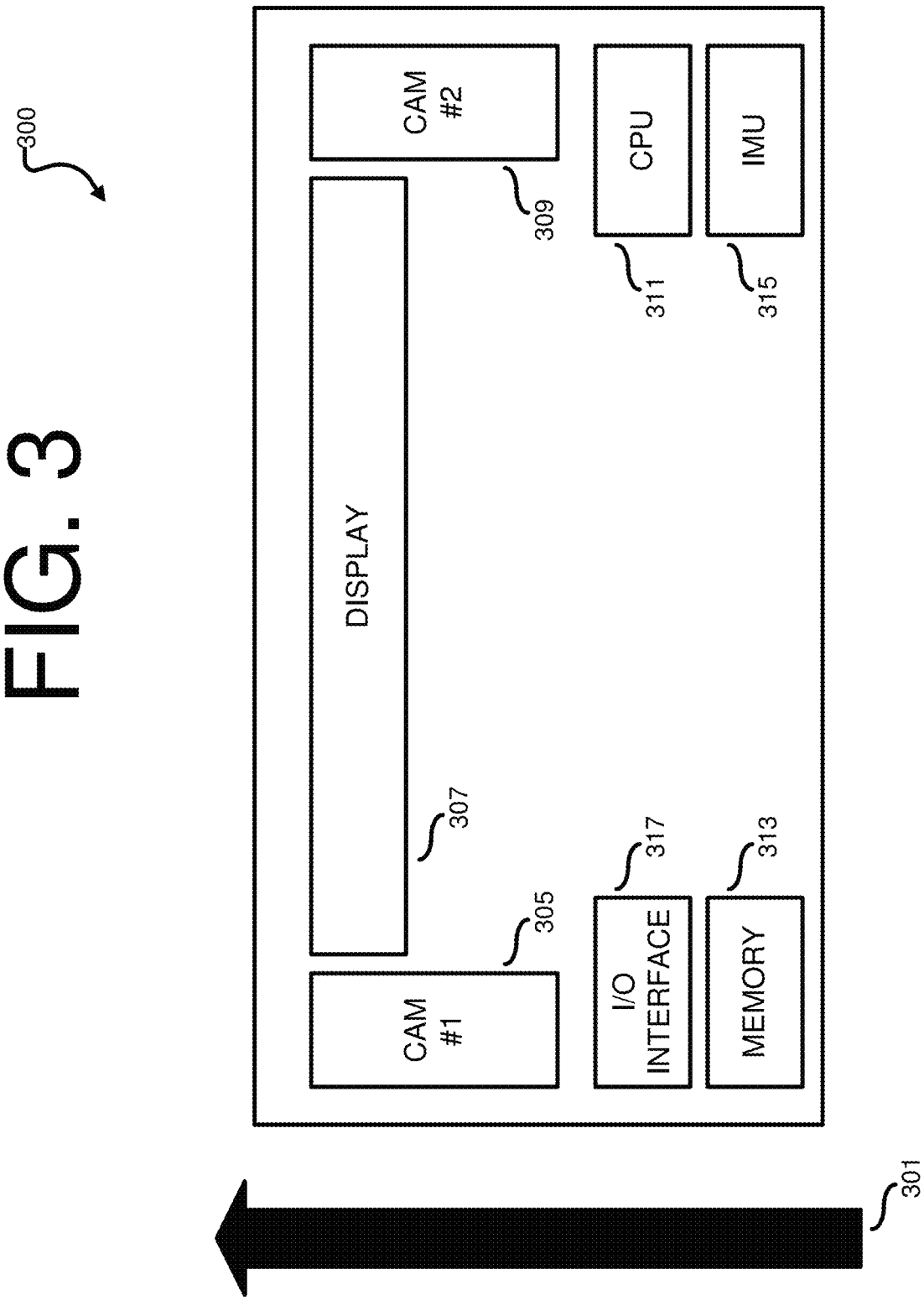
FIG. 3 illustrates an example of an augmented reality apparatus according to one or more embodiments of this disclosure.

FIG. 3 illustrates an example of an augmented reality (AR) apparatus 300 according to one or more embodiments of this disclosure. According to various embodiments, AR apparatus may function as a client device (for example, client platform 205 in FIG. 2) in communicative contact with a host system (for example, host platform 201 in FIG. 2) which maintains one or more databases of object signatures and augmentation data associated with object signatures. According to some embodiments, AR apparatus 300 may operate as an accessory device to another device (for example, a smartphone), which in turn acts as a client device to a host system maintaining associations between object signatures and augmentation data. In certain embodiments, associations between object signatures and augmentation data may be maintained across a variety of peer devices, rather than according to a host-client architecture.

Referring to the non-limiting example of FIG. 3, AR apparatus 300 includes an externally oriented camera 305. For the purposes of explaining this non-limiting example, the arrow 301 is provided. Arrow 301 points externally, towards a field of view away from the direction of projection of an internal-facing display of AR apparatus 300. According to various embodiments, externally oriented camera 305 is an RGB digital video camera (for example, a camera using a CMOS sensor). According to some embodiments, externally oriented camera 305 is a camera capable of detecting light at wavelengths outside the visible range of the human eye (for example, infrared). In certain embodiments, externally oriented camera 305 is a dynamic vision sensor (DVS), which provides an event stream of changes in the intensity of light received at pixels of a sensor of the DVS. In this non-limiting example, externally-oriented camera 305 generates image data, either as an event stream or as discrete image frames, which are passed to a PCAR framework (for example, PCAR framework 220 in FIG. 2).

Referring to the non-limiting example of FIG. 3, AR apparatus 300 includes display 307. According to various embodiments, display 307 displays, in an internally-facing direction (e.g., in a direction having a component that is opposite to arrow 301) items of AR content in conjunction with views of objects in an externally-facing field of view. According to some embodiments, display 307 is clear (similar to, for example, the displays used in "smart glasses" or "heads-up displays" on the cockpit glass of an airplane) and views of objects in externally-facing fields of view come from light passing through display 307. According to various embodiments, (sometimes referred to as "mixed reality") display 307 is opaque, and views of objects in externally-facing fields of view come from image data from externally-oriented cameras (for example, externally-oriented camera 305).

According to various embodiments, AR apparatus 300 includes second camera 309. In some embodiments, second camera 309 is an externally-oriented camera of the same type as externally-oriented camera 305, thereby forming a stereoscopic pair which can generate image data comprising depth estimation. In certain embodiments, second camera 309 is an externally-oriented camera with a different sensor type than externally-oriented camera 305. For example, in some embodiments, to extend battery life and minimize processor usage, externally-oriented camera 305 is a DVS sensor, and second camera 309 is a CMOS type camera, which, while less efficient than a DVS sensor, can provide additional image data (for example, data regarding colors and elements of a scene whose brightness may not change at a level detectable by a DVS sensor) that is useful for object recognition. According to various embodiments second camera 309 is an internally-facing camera, which tracks the motion of a user's eyes, and by implication, the direction of the user's gaze. Gaze tracking can be used to support foveal rendering of items of AR content, which can conserve battery and processor resources by rendering items of AR content away from a viewer's gaze at lower resolutions.

According to certain embodiments, AR apparatus 300 includes processor 311 and memory 313. In certain embodiments, memory 313 contains program code, which when executed by processor 311, causes AR apparatus 300 to execute an AR application (for example, AR application 230 in FIG. 2), or one or more components of a PCAR framework (for example, PCAR framework 220 in FIG. 2).

Referring to the non-limiting example of FIG. 3, AR apparatus 300 includes an inertial measurement unit 315, which generates location data associated with the motion of AR apparatus 300 along one or more degrees of freedom. In certain embodiments, data output from IMU 315 may be used for positioning (for example, to confirm a geospatial position of AR apparatus 300), or to obtain image stabilization data (for example, data indicating the direction and periodicity of a camera shake) to facilitate object recognition.

In some embodiments, AR apparatus 300 includes input/output interface 317. According to various embodiments, I/O interface 317 provides communicative connectivity between AR apparatus 300 and at least one other electronic device, such as a smartphone, or computer to which AR apparatus 300 is an accessory device. According to certain embodiments, I/O interface 317 connects AR apparatus over a network to a host platform providing a PCAR database. I/O interface is, in certain embodiments, a wireless communication interface, such as a Bluetooth transceiver, or communication hardware supporting communications over one or more longer range wireless systems (for example, communication unit 110 in FIG. 1).

Figure 4:
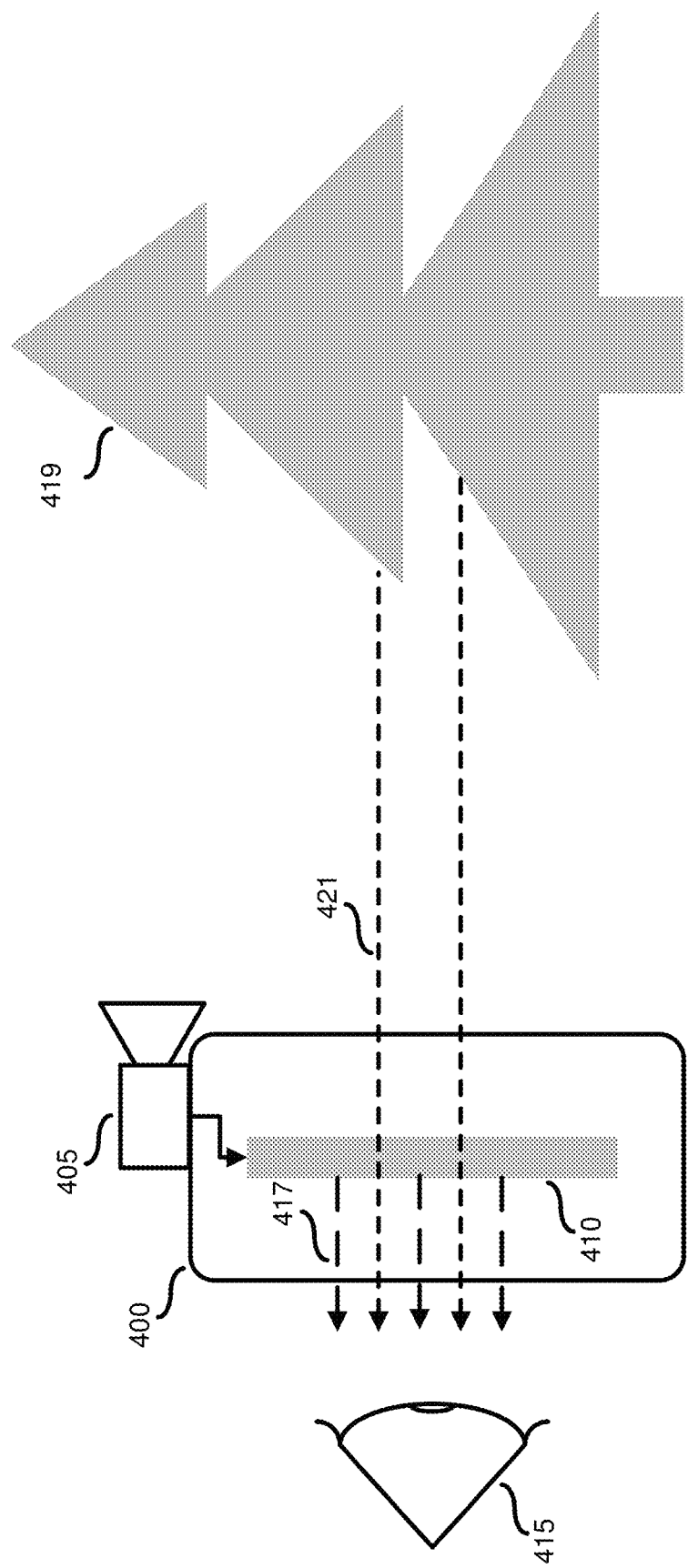
FIG. 4 illustrates an example of fields of view at an AR apparatus according to some embodiments of this disclosure.

FIG. 4 illustrates an example of fields of view at an AR apparatus according to some embodiments of this disclosure. The example of fields of view shown in FIG. 4 is for illustration only and other examples could be depicted without departing from the scope of the present disclosure.

Referring to the non-limiting example of FIG. 4, an AR apparatus 400 is shown. AR apparatus 400 comprises an externally-oriented camera 405, which is a camera trained on a field of view (e.g., a "camera field of view") comprising a set of viewing angles which have a component which points away from the direction from an internally-facing display of the AR apparatus and an intended viewing location 415 (represented in this example by a viewer's eye). In some embodiments, externally-oriented camera 405 gathers image data from the camera field of view. AR apparatus 400 recognizes objects in the camera field of view, and a PCAR framework running on AR apparatus provides items of AR content (represented by arrow 417) associated with the recognized objects to internally-facing display 410 to be presented towards intended viewing location 415.

According to various embodiments, internally-facing display 410 is at least partially transparent, thereby allowing light from external objects located along viewing angles within a field of view in which AR content can be displayed (e.g., an "AR field of view") to pass through internally-facing display 410 to intended viewing location 415. In this non-limiting example, light from tree 419 (represented by arrow 421) passes through display 410 to intended viewing location. Thus, the view at intended viewing location includes both light from tree 419, as well as one or more items of AR content associated with tree 419.

Figure 5:
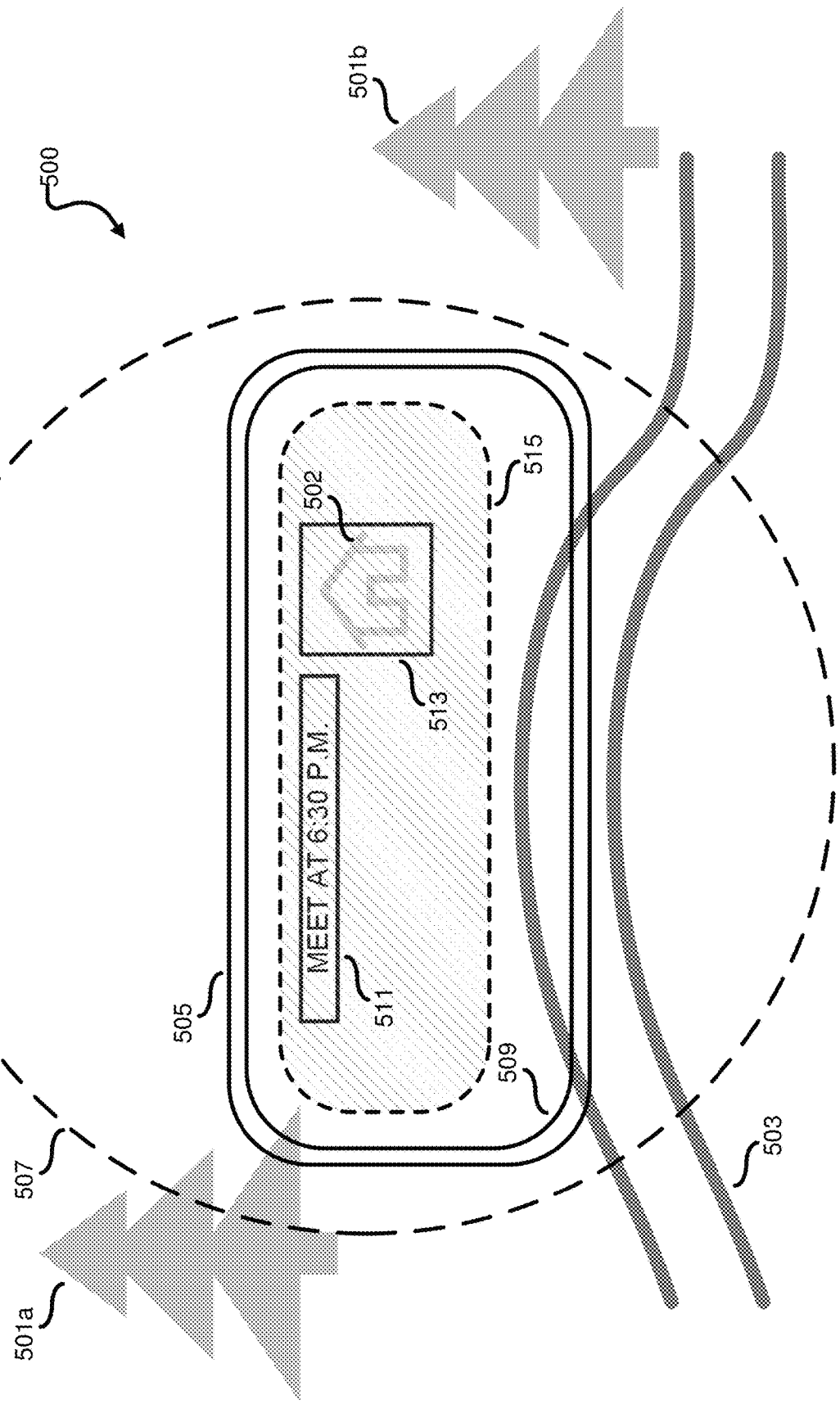
FIG. 5 illustrates an example of fields of view at an AR apparatus according to various embodiments of this disclosure.

FIG. 5 illustrates an example of fields of view at an AR apparatus according to various embodiments of this disclosure. The example of fields of view shown in FIG. 5 is for illustration only and other examples could be depicted without departing from the scope of the present disclosure.

Referring to the non-limiting example of FIG. 5, a scene 500 is shown from a viewing point along an internally-facing direction relative to an AR apparatus 505. In this illustrative example, scene 500 includes first tree 501a, second tree 501b, house 502 and stream 503.

According to certain embodiments, AR apparatus 505 includes an externally-oriented camera covering a range of view angles defining a camera field of view 507, which includes first tree 501a, house 502 and part of stream 503. Further, AR apparatus 505 includes an internally-facing display 509. In this non-limiting example, internally-facing display 509 is at least partially transparent, and permits light from first tree 501a and house 502 to pass to the viewing point. According to some embodiments, internally-facing display 509 comprises one or more regions in which items of AR content (for example, notification 511 and object frame 513) can be displayed. In the non-limiting example of FIG. 5, the portions of internally-facing display 509 cover a range of viewing angles which defines an AR field of view 515.

Referring to the non-limiting example of FIG. 5, a PCAR framework operating on AR apparatus 505 recognizes house 502 from image data of camera field of view 507, determines (for example, based on a signature comparison) that house 502 is an augmentation target, and responsive to determining that house 502 is an augmentation target, displays AR content comprising object frame 513, which identifies house 502 as a recognized object, and notification 511, which is associated with house 502.

Note that, depending on the design objectives, the relative proportions of camera field of view 507 and AR field of view 515 may change. Additionally, depending on applications, the proportions of AR field of view relative to internally-facing display 509 might change. In certain embodiments, such as, for example, an AR apparatus to be used in connection with active pursuits, such as skiing or mountain biking, it may makes sense for camera field of view 507 to extend significantly beyond AR field of view 515. In such embodiments, an externally-oriented camera may be able to identify hazards in a user's peripheral vision and provide AR content (for example, a warning regarding a vehicle rapidly approaching from the side). In some embodiments, it may be appropriate for AR field of view 515 to comprise a relatively small portion of display 509, so as to avoid distractions. In various embodiments, it may be appropriate for camera field of view 507 to comprise a subset of AR field of view 515. For example, in embodiments where the AR apparatus is a headset intended for use in applications involving small, near field details (for example, surgery), the externally-oriented camera may provide a magnified view of a small area, which is surrounded by an AR field of view in which multiple pieces of AR content (for example, a patient's vital signs) can be presented.

FIG. 6 illustrates an example of a PCAR database schema 600 according to certain embodiments of this disclosure. The embodiment of the PCAR database schema 600 shown in FIG. 6 is for illustration only and other examples could be depicted without departing from the scope of the present disclosure.

Referring to the non-limiting example of FIG. 6, in certain embodiments, associations between objects which can be identified based on image data from AR apparatus and augmentation data used to generate items of AR content, as well as user-managed attributes of items of AR content are maintained in a PCAR database (for example, PCAR database 203 in FIG. 2) on a host platform. In some embodiments, a PCAR database is a relational database utilizing a schema, such as schema 600. In certain embodiments, PCAR database is a columnar database, or other suitable structure for storing and managing associations between objects, augmentation data, and items of AR content.

According to certain embodiments, values of an object signature 605 field serve as a primary key (PK) of database schema 600. In some embodiments, an object signature comprises a unique identifier of an object associated with one or more items of augmentation data used to generate items of AR content. In some embodiments, an object signature is a unique identifier of a particular instance of an object (for example, a refrigerator in a particular location, such as a house). In certain embodiments, the object signature comprises a unique identifier of an object for which there may be multiple instances (for example, a particular model of television, or a model of car). In the illustrative example of FIG. 6, the object signatures are assigned numbers for objects (for example, signature 607, which corresponds to the assigned number "1"). In certain embodiments, to enhance security, signatures may correspond to an alphanumeric string (for example, a hash of descriptors of an object and other associated data), or an encryption thereof.

In the non-limiting example of FIG. 6, schema 600 includes a "User ID" field 610, the values of which correspond to identifiers of a user who created an association between an object having an object signature and augmentation data. For example, the User ID "Martha" is associated with the object signature "2," identifying Martha as the creator and manager of an item of an item of AR content, the item of AR content being associated with "Virtual Object" augmentation data 609.

According to various embodiments, schema 600 includes an Augmentation Data field 615. In certain embodiments, the values of augmentation data field 615 comprise pointers to locations where data for an item of AR content are stored. For example, the "Text and Web Content Item" augmentation data 617 associated with object signature 607 may correspond to images and text stored at location at an edge caching server, the address of which is provided to an AR application (for example, AR application 230 in FIG. 2), and which the AR application accesses to assemble an item of AR content for display on the AR apparatus. In some embodiments, augmentation data may comprise an actual item of AR content (for example, a video to be played at an AR apparatus).

In certain embodiments according to this disclosure, schema 600 includes a visibility field 620, which is an attribute of the association between an object (as identified by its object signature) and one or more items of augmentation data. As shown in the non-limiting example of FIG. 6, values in visibility field 620 correspond to identifiers of users who can access the augmentation data associated with a particular object signature. For example, visibility value 619 specifies that "Martha" is the user with permission to see item(s) of AR content based on augmentation data 617, in response to an AR apparatus associated with Martha recognizing, based on obtained image data, an object having object signature 607.

As shown in the non-limiting example of FIG. 6, schema 600 also includes object location field 625, whose values specify a location, or set of locations associated with an object having a particular object signature value. According to various embodiments, object location data can be used to distinguish between objects which are generic augmentation targets (for example, any instance of a particular model of automobile), and objects which are specific augmentation targets (for example, a specific instance of a recognized refrigerator at a particular location, which is a user's or viewer's "home fridge."). For example, object location value 627 indicates that the object associated with object signature 607 is located indoors at a specific set of GPS coordinates. In this way, a PCAR database or a PCAR framework utilize object location 627 in determining whether to present an item of AR content based on augmentation data 617 in response to recognizing an object having object signature 607. If the PCAR database or PCAR framework determines that the recognized object is outside or at a different GPS location, the item of AR content will not be presented. As another example, object location value 629 is equal to "anywhere," indicating that there are no location-based constraints on presenting an item of AR content based on augmentation data 609.

In various embodiments, schema 600 includes expiration time field 630, the values of which specify the duration an item of AR content associated with the augmentation target having a given object signature is to be available for viewing. As an example, expiration time value 631 specifies that item(s) of AR content based on augmentation data 617 are to be available until read by a user specified in visibility field 620. As another example, expiration time value 633 is "indefinite," indicating that AR content based on augmentation data 609 will be persistently available to "John" and "Ted" in response to recognizing objects having object signature.

While not shown in the illustrative example of FIG. 6, schema 600 can include other fields, such as fields indicating a relationship (for example, a hierarchical, or parent-child relationship) between object signatures. For example, a particular chest of drawers may be associated with a first object signature. At the same time, a drawer, or other sub-component of the chest of drawers, may be associated with a second object signature. A relationship field of schema 600 may include values specifying a parent-child relationship between the chest of drawers, and a particular dresser. In this way, AR communications utilizing the chest of drawers as an augmentation target may be more nuanced and effective. For example, a first user may associate an AR item with the chest of drawers, the AR item comprising a note saying that a second user has clean laundry, which is in a particular drawer within the chest of drawers. Further, the database entry associating the item of AR content with the chest of drawers may include a value in a relationship field specifying a particular drawer, which may also be associated with a second item of AR content.

Figure 7:
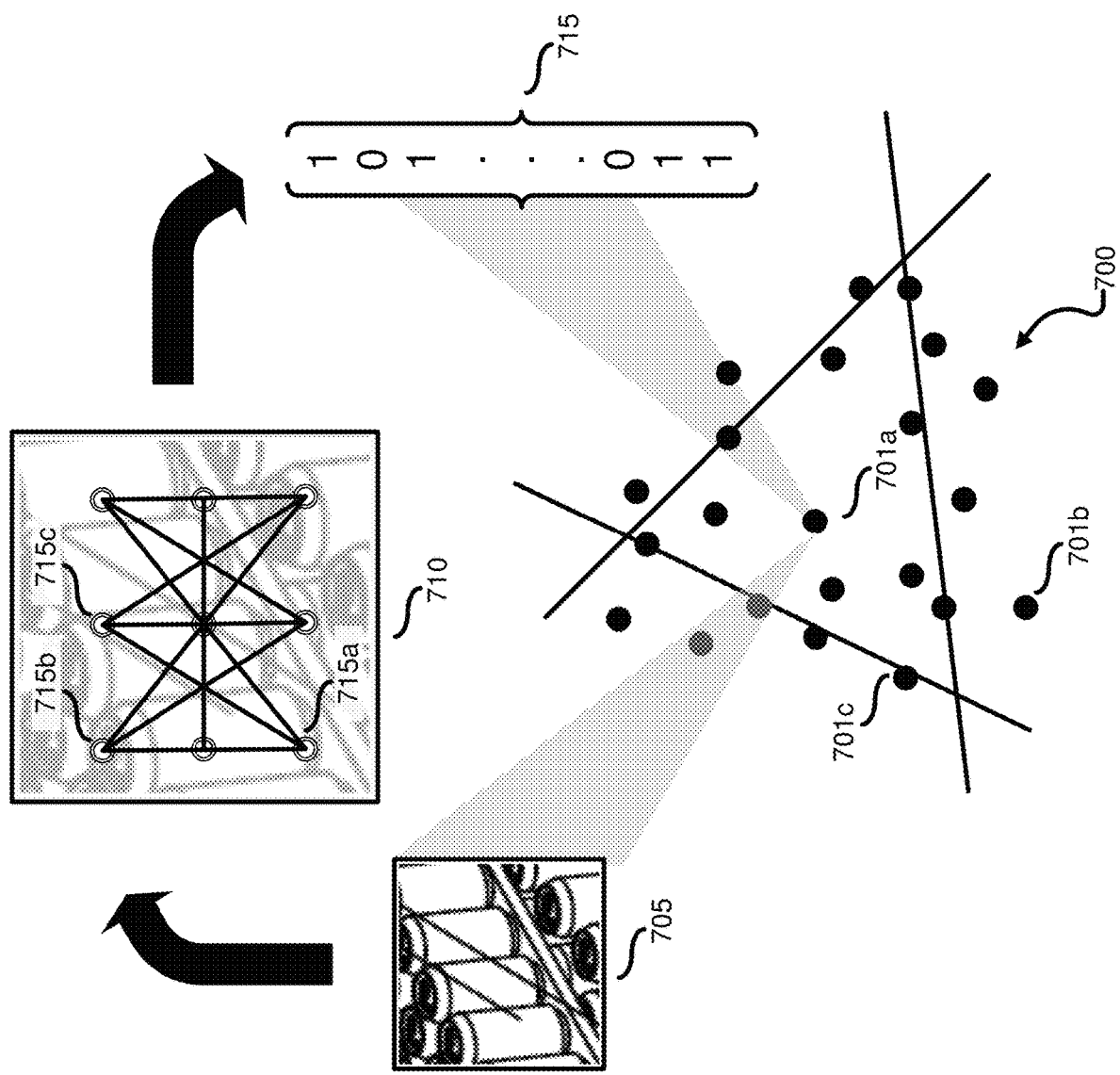
FIG. 7 illustrates aspects of image recognition using binary image descriptors, according to various embodiments of the present disclosure.

FIG. 7 illustrates aspects of image recognition using binary image descriptors, according to various embodiments of the present disclosure. The example of the image recognition shown in FIG. 7 is for illustration only and other examples could be depicted without departing from the scope of the present disclosure.

Certain embodiments according to this disclosure recognize objects from image data obtained over a camera field of view by recognizing three dimensional feature points (also referred to as "smart feature points") within the image data of a scene. According to certain embodiments, three dimensional feature points comprise characteristic features (for example, corners and relationships between corners) of objects which can be reliably found within image data obtained at an AR apparatus. Various embodiments according to this disclosure recognize three dimensional feature points of objects (including objects which are augmentation targets) by using binary image descriptors.

Referring to the non-limiting example of FIG. 7, a three dimensional feature space 700 is shown. According to various embodiments, three dimensional feature space 700 is a three dimensional section of the physical world covered by the field of view of an externally-facing camera of an AR apparatus. According to various embodiments, a recognition engine (for example, object recognition engine 227 in FIG. 2) or other image analysis process, obtains image data comprising patches associated with points in the feature space, such as points 701*a*, 701*b* and 701*c* shown in FIG. 7. In certain embodiments, the image patches are selected based on a visual scanning/search algorithm of the recognition engine. In various embodiments, the image patches are selected based on existing knowledge regarding the feature space, such as a map of known features of the space based on previously obtained image data.

As shown in the non-limiting example of FIG. 7, image patch 705 is obtained from image data obtained at point 701*a*. According to various embodiments, a binary representation of image patch 705 is obtained by image intensity data at points of a sampling pattern. As shown by graphic 710, in this illustrative example, the sampling pattern comprises a 3×3 grid which includes sampling points 715*a*, 715*b* and 715*c*. According to various embodiments, a representative slice of the visual information contained in patch 705 can be encoded as a binary string or binary vector, by comparing the intensity value of a predetermined set of pairs of sampling points within the sampling pattern. In the non-limiting example of FIG. 7, in the predetermined set of pairs of sampling points is represented through lines connecting a given sampling point to certain other sampling points. In certain embodiments, where a given sampling point of a sampling point pair in a patch has the higher intensity value of the sampling point pair, a "1" is written to the binary string. Similarly, if the sampling point has a lower intensity value than a conjugate sampling point of the sampling point pair, a "0" is written to the binary string of binary vector. By repeating this comparison across the predetermined set of sampling vectors, a binary string or binary vector 715 representing the patch is generated.

According to certain embodiments, binary vector 715 can be rapidly compared against other binary vectors describing features of objects to be recognized (also known as "binary descriptors") by calculating the Hamming distance (for example, a value representing the number of divergent or similar values between two binary vectors) or by applying an exclusive OR ("XOR") operation to values of a binary vector encoding information from an image patch (for example, binary vector 715) and a binary vector representing a feature of a recognizable object. Where a hamming distance or value of an XOR operation is within an acceptable range, the image patch is recognized as a feature of an object. In certain embodiments, by iteratively encoding and comparing patches of image data obtained across feature space 700, objects within the space can be recognized the purposes of AR based communication.

FIGS. 8A through 8F illustrate aspects of augmented reality-based communication according to certain embodiments of this disclosure. In the illustrative examples of FIGS. 8A-8F, a method of communication according to this disclosure is shown from the perspective of an AR field of view of an apparatus (for example, AR apparatus 300 in FIG. 3) implementing a PCAR framework (for example, PCAR framework 220 in FIG. 2).

Figure 8A:
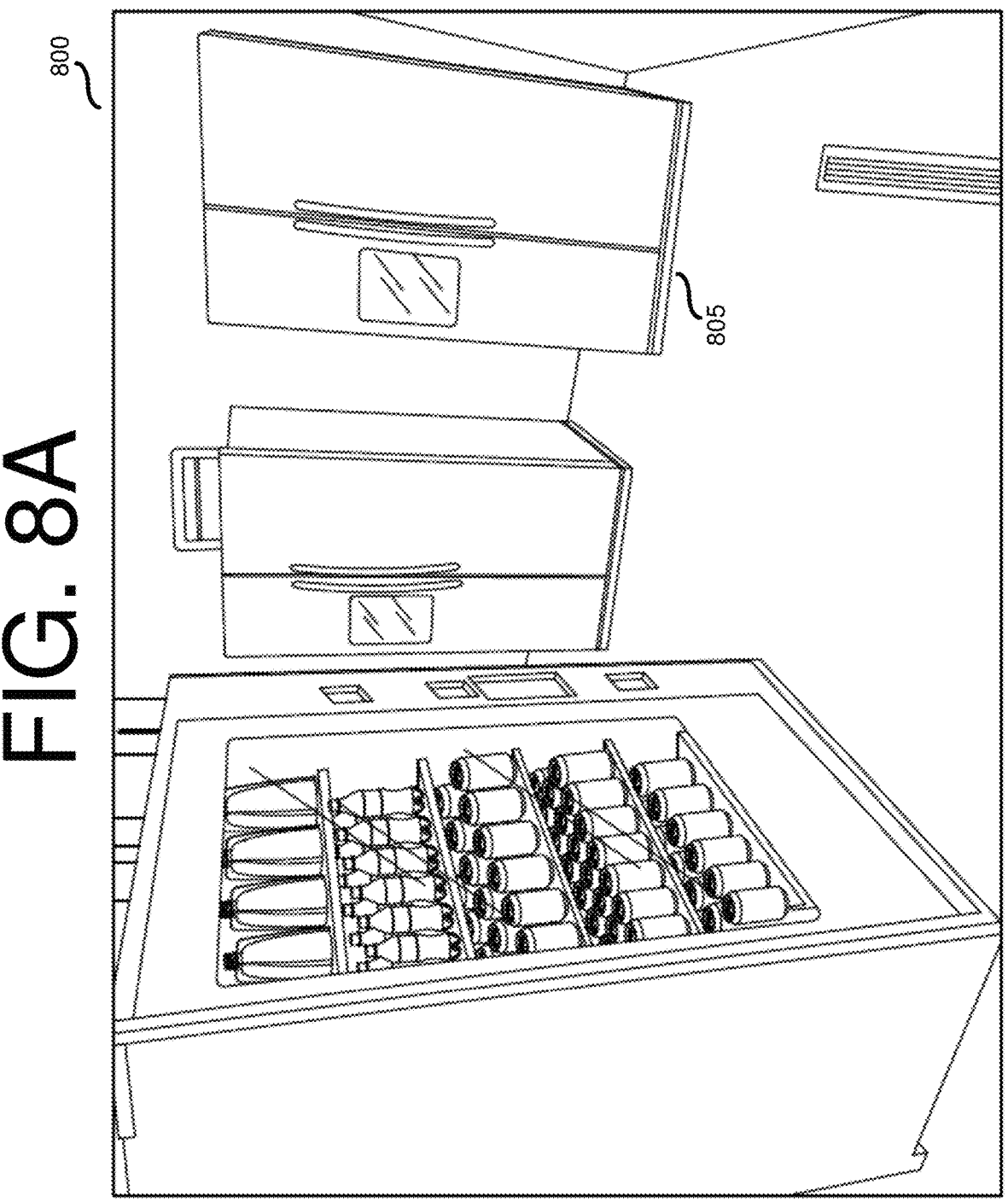

Referring to the non-limiting example of FIG. 8A, the portion of a scene 800 visible within the AR field view of an AR apparatus is shown at an initial time, such as immediately after the wearer of the AR apparatus enters the room containing the elements of scene 800. According to certain embodiments, the elements of the scene, such as refrigerator 805 are visible from light within the scene passing through a clear display (for example, display 410 in FIG. 4) of the AR apparatus. While not depicted in the non-limiting example of FIG. 8A, in addition to allowing light from the scene to pass through the display, the AR apparatus is also obtaining image data of a camera field of view of one or more externally-oriented cameras and processing the image data to identify objects within the camera field of view.

Figure 8B:
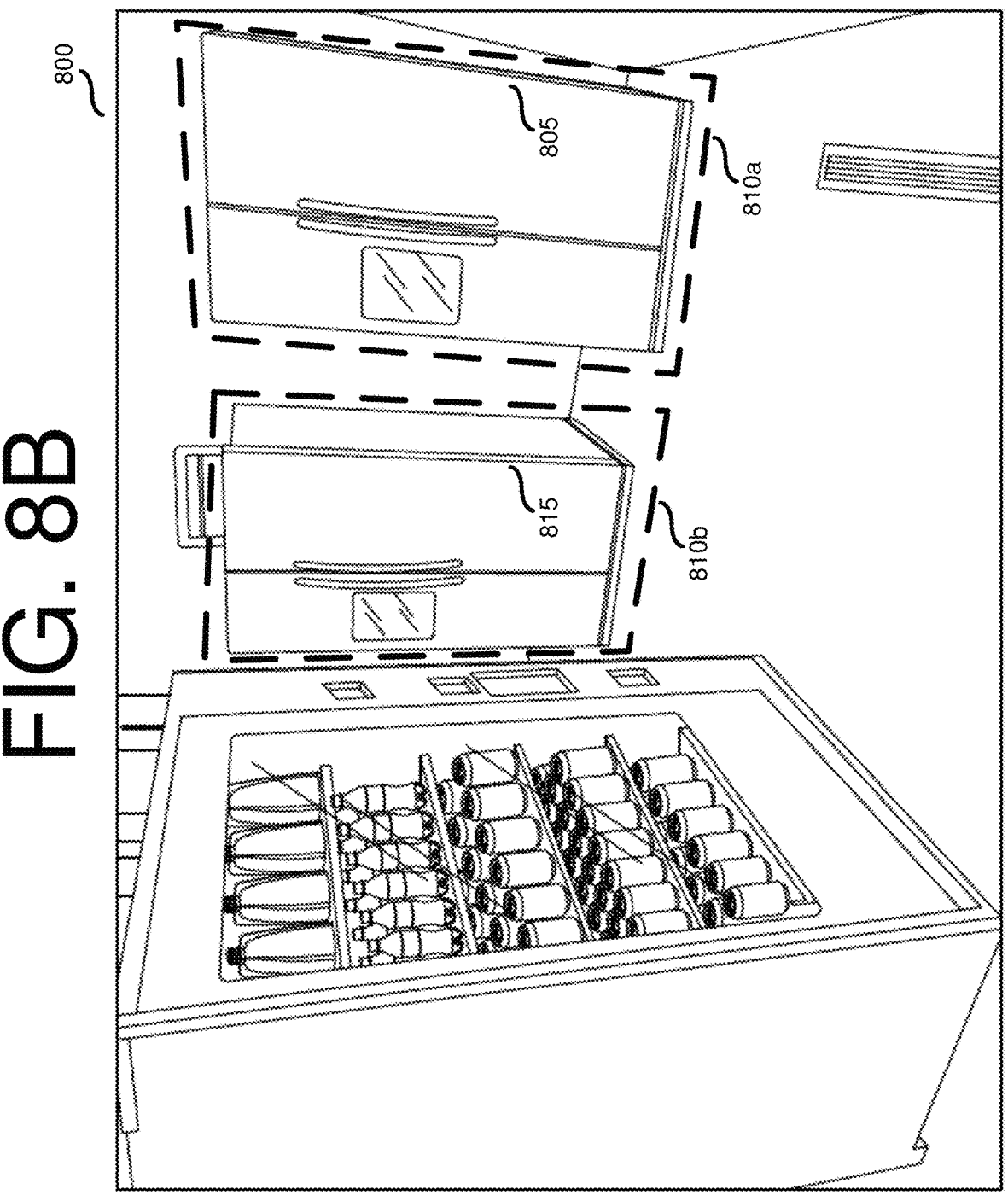

Referring to the non-limiting example of FIG. 8B, elements of an AR field of view of scene 800 are illustrated. In this non-limiting example, two items of AR content—first highlighting frame 810*a* and second highlighting frame 810*b* are depicted in a portion of the AR field of view at locations of the display coinciding with the position of refrigerator 805 and second refrigerator 815. According to certain embodiments, the AR apparatus, or a PCAR framework implemented on a device connected to the AR apparatus, has identified, based on binary descriptors of the refrigerators in image data from an externally-oriented apparatus, the refrigerators. Further, having identified the refrigerators, the AR apparatus has performed a calculation to map the location of refrigerator 805 to a location, or a coordinate representing a location, in the AR field of view. Additionally, according to certain embodiments, the AR apparatus is in an augmentation mode, and has determined that refrigerator 805 and second refrigerator 815 are augmentation targets, which can be associated with an item of AR content (for example, a note or message) to communicate with other AR apparatus users.

In certain embodiments, the AR apparatus's identification of objects within scene 800 can be assisted by data provided by the PCAR framework and/or the objects themselves. In one non-limiting example, the PCAR framework can provide an AR apparatus with additional object information (for example, an identification of objects near the current location of the AR apparatus). This additional object information can be used to provide notifications to a user of the AR apparatus when a predetermined condition (for example, a proximity value to the object) is satisfied. Thus, in one example, a user of an AR apparatus may, upon entering the room of scene 800, receive a message notifying him of refrigerator 805 being an augmentation target. Additionally, in instances where an item of AR content has already been associated with refrigerator 805, the additional object notification may be more specific, such as a message of the form "Message for you on the refrigerator." Through the use of such additional object information, computing and battery resources of an apparatus may be conserved, potentially less image data needs to be received to recognize an object if a user is given an indication of the object to be recognized.

Additionally, in certain embodiments, objects within scene 800 themselves may broadcast or otherwise provide an AR apparatus of their identity, as well as additional object information. For example, refrigerator 805, may, in some embodiments, include a Bluetooth Low Energy transmitter, or LED beacon which emits a signal informing AR apparatus that it is an augmentation target, or that a piece of AR content is associated with refrigerator 805. Here, the object itself provides additional assistance as to the presence of augmentation targets and/or associations between items of AR content and the object, thereby potentially reducing the amount of image data an AR apparatus must process to find augmentation targets within scene 800.

Turning to the non-limiting example of FIG. 8C, which illustrates elements of scene 800 within an AR field of view. In this illustrative example, a user (identified as "John") has provided an input (for example, a verbal command or eye gesture) initiating the process of creating an association between an augmentation target (in this case, refrigerator 805) and one or more items of AR content. According to certain embodiments, John's input triggers the display of option menu 820, which presents various user-selectable parameters of an association between the augmentation target and one or more items of AR content. As shown in this non-limiting example, the user-selectable parameters comprise a type 821 of AR content to be associated with the augmentation target, users 823 to whom the selected AR item(s) of AR content will be visible, and an expiration or duration time 825 for the association between the augmentation target and the item(s) of AR content. In certain embodiments, the user-selectable parameters of option menu 820 may map to one or more fields of a PCAR database schema (for example, schema 600 shown in FIG. 6).

Turning to the non-limiting example of FIG. 8D, which illustrates an input window 830 presented to the user in response to a selection of parameters further defining the association between the augmentation target and an item of AR content. In this illustrative example, the user "John" has selected the values "TEXT" from type 821, "JEN" from users 823, and "UNTIL READ" from time 825, and has been presented with input window 830, which allows a user to input textual data to be provided as part of an item of AR content associated with an augmentation target. In this non-limiting example, the user "John" inputs text describing food which has been left for a user specified by a value of users 823 in option menu 820. In various embodiments according to this disclosure, after the user creating the association between an augmentation target and an item of AR content (in this case, a message to be seen by certain users who look at refrigerator 805 through AR apparatus connected to a PCAR database), the text inputted through input window 830, along with values for the parameters inputted via option menu 820, as well as location, and user profile information, is transmitted to a platform hosting a database (for example, PCAR database 203 in FIG. 2) of associations between augmentation targets, items of AR content, and parameters of the associations.

Figure 8E:
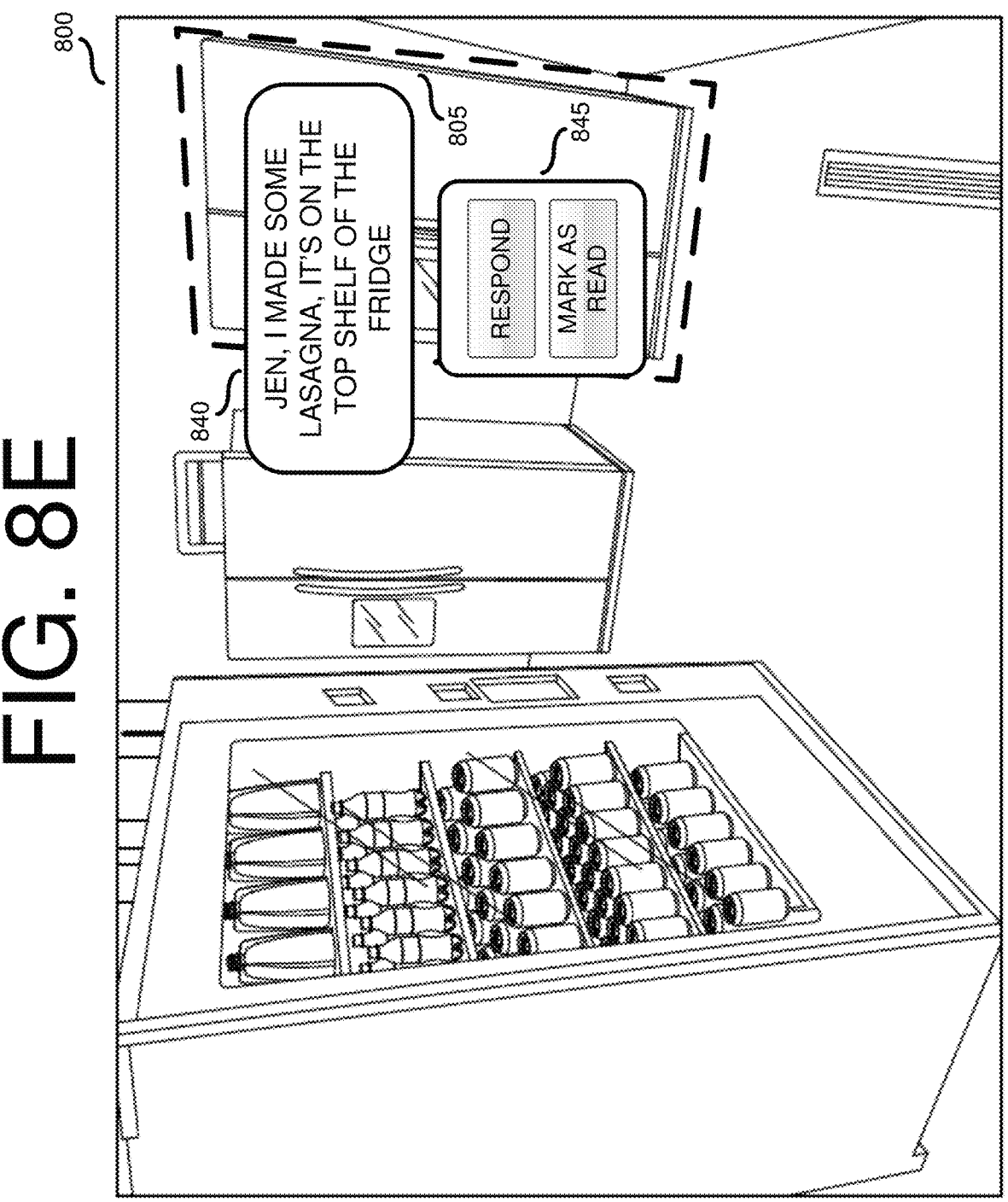

FIG. 8E illustrates elements of scene 800 in the AR field of view of an AR apparatus associated with the user "Jen" selected by the user "John" via option menu 820. In this non-limiting example, the PCAR framework of Jen's AR apparatus is operating in a "normal" mode, and has identified refrigerator 805 as an augmentation target. According to various embodiments, the PCAR framework on Jen's device recognizes refrigerator 805 as an augmentation target using the same object recognition technique as a PCAR framework on John's device (for example, object recognition based on comparing binary descriptors of patches of image data against binary descriptors of features). According to certain embodiments, Jen's device may recognize refrigerator 805 as an augmentation target using a different method, such as by recognizing a visually coded link to a reference in a PCAR database (for example, a QR code) on the refrigerator, or detecting an identifying signal from the refrigerator (for example, an IR beacon on the refrigerator transmitting an identification code). Having determined that refrigerator 805 is an augmentation target, the PCAR framework on Jen's device generates an object signature associated with refrigerator 805.

In this illustrative example, the object signature generated at Jen's device matches an object signature for refrigerator 805 maintained at a PCAR database. Further, Jen's user profile matches a value associated with a permission to view the AR content associated with the object signature. As such, Jen receives data associated with an item of AR content (for example, the text of John's message, as well as information specifying how long the image is to be presented. Based on the received data, an item of AR content 840 is presented on a display of Jen's AR apparatus. In this non-limiting example, Jen is presented with a second option window 845, which allows her to choose between either marking John's message as having been read, or responding to John's original message.

Figure 8F:
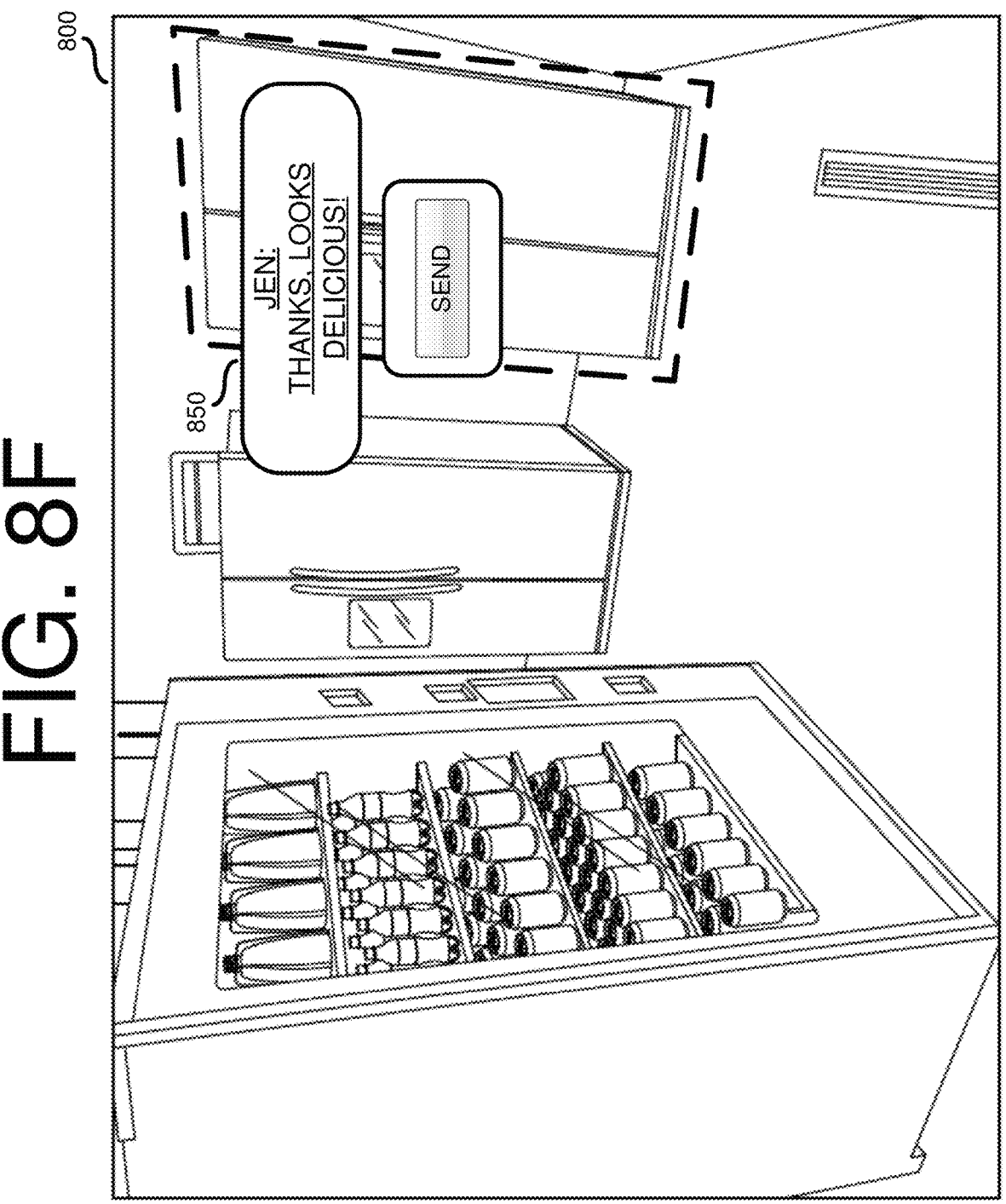

FIG. 8F illustrates elements of scene 800 within the AR field of view of the AR apparatus associated with the user "Jen." In this non-limiting example, Jen selected "Respond" in second option window 845, and has composed a response message 850 (for example, an email or text message) to be sent to John in response. As shown above, certain embodiments according to the present disclosure enhance the functionality of smartphones and other AR apparatus by allowing AR to be used as either a standalone communication tool, or as a complement to other communication tools, such as text and email.

FIGS. 9A through 9D illustrate aspects of augmented reality-based communication according to various embodiments of this disclosure. The embodiments of the augmented reality-based communication shown in FIGS. 9A through 9D are for illustration only and other embodiments could be used without departing from the scope of the present disclosure.

Figure 9A:
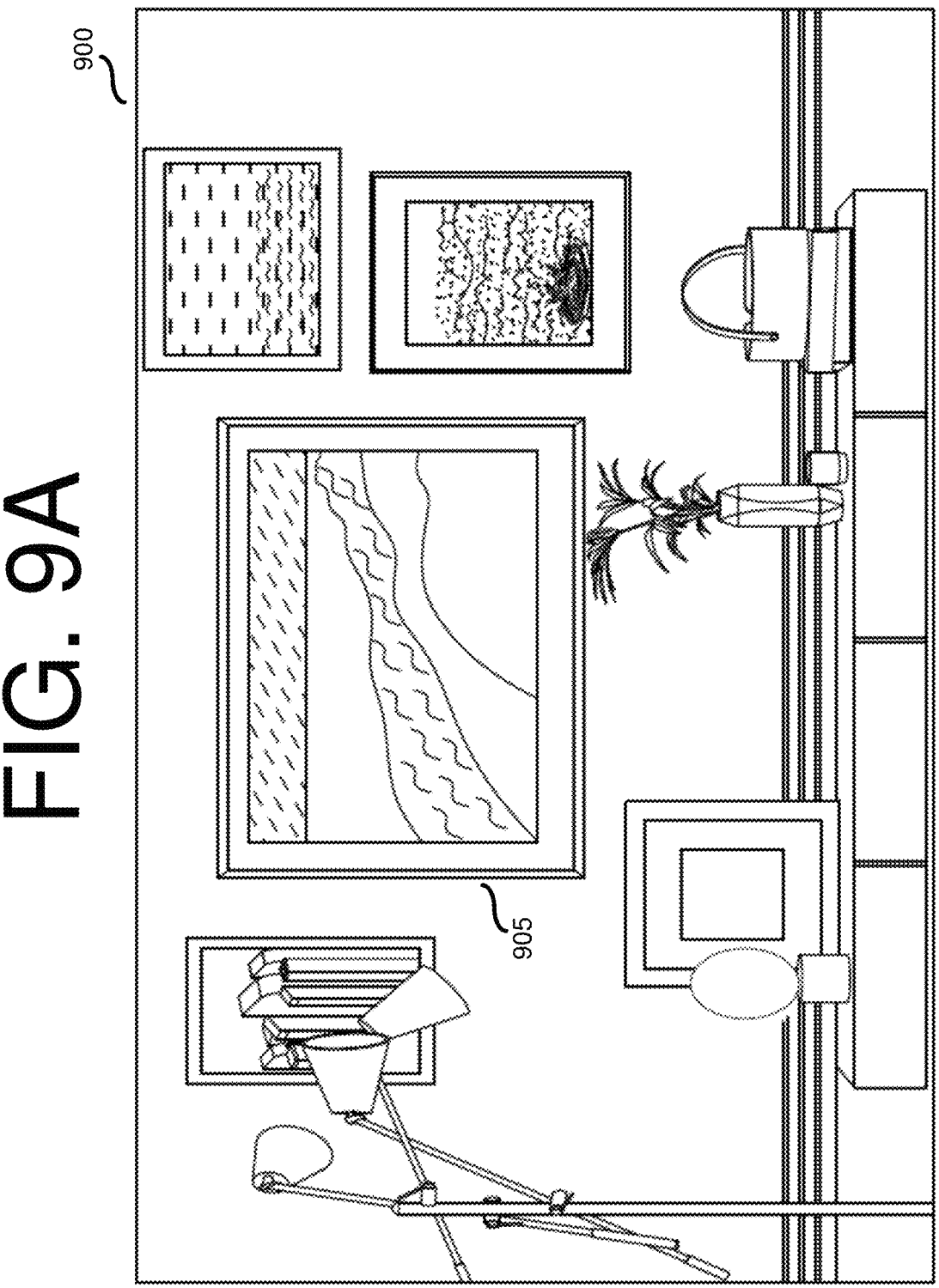

The non-limiting example of FIG. 9A illustrates elements of a scene 900 visible in the AR field of view of an AR apparatus associated with a first user, Mary. In this non-limiting example, the elements of scene 900 visible in the AR field of view include television 905.

Figure 9B:
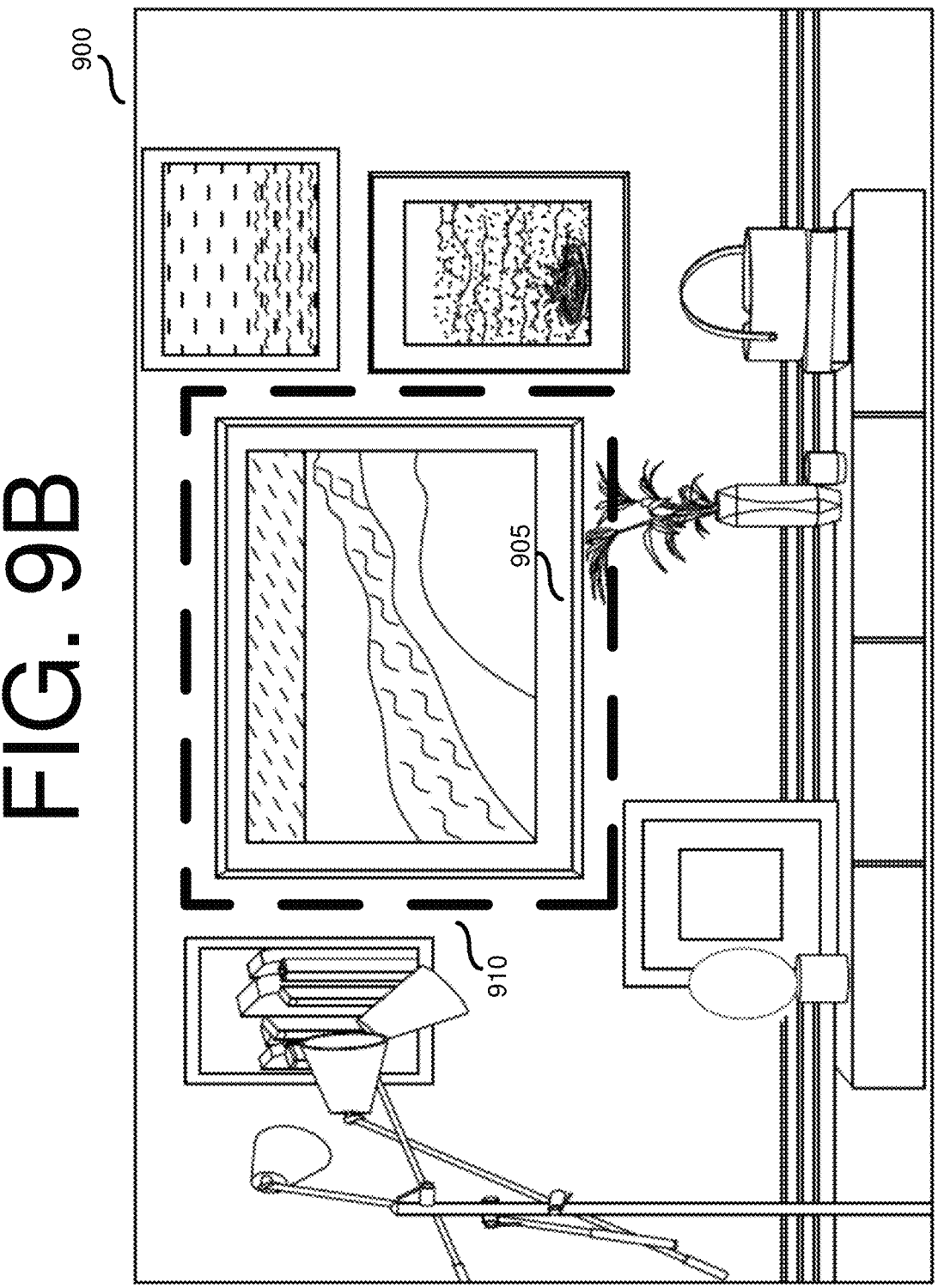

The non-limiting example of FIG. 9B illustrates elements of scene 900 visible in the AR field of view of the AR apparatus associated with the user Mary. In this non-limiting example, Mary's AR apparatus has, based on image data of an externally-oriented camera of the AR apparatus, identified television 905 as both a television and an augmentation target, and having mapped the position of television 905 relative to the AR field of view, displays, highlighting frame 910 around television 905 on an internally-facing display of Mary's AR apparatus.

FIG. 9C illustrates elements of scene 900 visible in the AR field of view of Mary's apparatus. In this non-limiting example, in response to an input from Mary (for example, an affirmative input, such as a voice command, or an implied input, such as gaze tracking data indicating showing Mary looking at the augmentation target in a way that satisfies a specified criteria, such as a temporal threshold), a second item of AR content 915a is presented on an internally facing display (for example, a display like display 410 in FIG. 4). According to certain embodiments, the second item of AR content 915a may be based, at least in part, on data (for example, data maintained in a PCAR database) provided by a PCAR database in response to a match between an object signature of television 905 and descriptors of the television maintained in the PCAR database. In this non-limiting example, the second item of AR content 915a is based, at least in part, on a user profile data accessible to an AR application (for example, AR application 230 in FIG. 2) operating on Mary's AR apparatus. In various embodiments, such user profile data defines one or more presentation parameters (for example, a choice of language and personalization parameters, such as a name or photograph) of the second item of AR content 920. In the illustrative example of FIG. 9D, the presentation parameters drawn from a user profile associated with Mary include her name 917 and the use of English as the language for presenting the message regarding the television set in her AR field of view.

FIG. 9D illustrates elements of scene 900 visible in the AR field of view of a second user, "Lars." As illustrated by this non-limiting example, creating associations between augmentation targets and items of AR content according to embodiments of the present disclosure can provide an efficient and easily extensible method of personalized communications. In this non-limiting example, an AR apparatus associated with second user Lars, has, identified television 905 as an augmentation target, and presented a first item of AR content associated with the augmentation target on a internally-facing display of Lars's AR apparatus. Based on Lars's response to the first item of AR content, a second item of AR content 915b is displayed. According to various embodiments, second item of AR content 915b is based on the same data received from a PCAR database as second item of AR content 915a in FIG. 9C. Using the same information from a PCAR database, an AR application on Lars's AR apparatus can use information in Lars's user profile to apply different presentation parameters to substantially change the appearance of second item of AR content 915b relative to second item of AR content 915a. In this non-limiting example, information in Lars's user profile provides presentation parameters changing both the addressee 919 of the message, but also switching the language of the message text to German.

FIG. 10 illustrates operations of a method 1000 of operating a PCAR framework in a normal mode of operation. According to certain embodiments, a "normal mode of operation" of a PCAR encompasses a mode of operation in which the PCAR is "listening" or "looking" for items of AR content associated with identified augmentation targets in image data obtained from a camera field of view of an apparatus. In some embodiments, a "normal" mode of operation operates in parallel with an "augmentation mode," in which a PCAR framework is creating or updating an association between an augmentation target and an item of AR content. In certain embodiments, a "normal" mode of operation operates as an alternative to an "augmentation mode." While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, an electronic device.

Referring to the non-limiting example of FIG. 10, method 1000 includes operation 1010, wherein a PCAR framework (for example, PCAR framework 220 in FIG. 2) receives location data and image data from sensors connected to an AR apparatus (for example, image data from externally-oriented camera 405 in FIG. 4 and location data from a GPS sensor or IMU 315 in FIG. 3). According to various embodiments, image data is received by a camera field of view object recognition engine (for example object recognition engine 227 in FIG. 2) and location data is received at the PCAR framework by a signature engine (for example, signature engine 225 in FIG. 2).

According to various embodiments, at operation 1015, the PCAR framework performs an initial determination of whether there are any augmentations associated with the user device at a current device location (as determined from location data received in operation 1010). According to certain embodiments, the determination performed at operation 1015 comprises sending a query to a host platform (for example host platform 201 in FIG. 2) which maintains an index or other data structure associating locations, user devices and items of AR content. In certain embodiments, if the outcome of the determination at operation 1015 is negative, method 1000 loops back to operation 1010. If, however, the PCAR determines that there is an item of AR content associated with an augmentation target and visible to viewing devices with the user's profile and current device location, method 1000 proceeds to operation 1020.

In certain embodiments according to the present disclosure, at operation 1020, one or more components (for example, an augmentation engine, such as augmentation engine 229 in FIG. 2 and an object recognition engine, such as object recognition engine 227 in FIG. 2) determines whether there are objects within a given sensor range (for example, the field of view of an externally-oriented camera of an AR apparatus) which comprise augmentation targets. According to various embodiments, the determination of whether there are augmentation targets, and in particular, augmentation targets associated with items of AR content for the present user is performed by applying one or more object recognition algorithms to image data from the externally-oriented camera. In certain embodiments, the determination of whether there are augmentation targets associated with AR content for a present user may be assisted by the augmentation target itself. For example, the augmentation target may have one or more surfaces with a coded medium (for example, a barcode or QR code), bypassing the need for recognition of the object as the augmentation target. As another example, the augmentation target may also have a beacon (for example, a flashing infrared beacon) advertising itself as an augmentation target.

In the non-limiting example of FIG. 10, if, at operation 1020, the PCAR cannot find objects in the relevant sensor range(s) which are augmentation targets, method 1000 reverts back to operation 1010. When the PCAR, or a module thereof, such as an augmentation engine, finds objects within the relevant sensor range(s) which are augmentation targets, method 1000 proceeds to operation 1025.

In various embodiments according to the present disclosure, at operation 1025, responsive to finding object(s) within the relevant sensor range(s) (for example, the range of an IR beacon, or within a camera field of view of an externally-oriented camera of an AR apparatus), the PCAR interacts with one or more of a PCAR database (or other repository or data structure maintaining data storing associations between augmentation targets and items of AR content) and an AR application (for example, AR application 230 in FIG. 2) to display one or more items of AR content associated with an augmentation target found in operation 1020. According to some embodiments, the item of AR content is a highlighting frame (for example, first highlighting frame 810a in FIG. 8C). In various embodiments, the item of AR content displayed at operation 1025 comprises a communicative piece of content (for example, second item of AR content 915a in FIG. 9C).

Referring to the non-limiting example of FIG. 10, at operation 1030, the PCAR framework provides information regarding the present user's interaction to the device(s) maintaining the PCAR database to update the data defining the association between the augmentation target and the item(s) of AR content. For example, the PCAR framework may provide information indicating that a particular item of AR content (for example, item of AR content 840 in FIG. 8E) has been read or responded to. Based on the provided information, and the specified parameters of the association between augmentation target and item of AR content (for example, display settings specifying that the item of content is to be displayed until read) the PCAR database may be updated (for example, by canceling or deleting the association between the augmentation target and item of AR content).

FIG. 11 illustrates operations of a method 1100 of operating a PCAR framework in an augmentation mode, according to at least one embodiment of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, an electronic device. Further, while the operations of method 1100 are described with reference to an exemplary embodiment in which the operations are carried out by a PCAR framework on an electronic device, in certain embodiments, performance of the operations of method 1100 may be distributed across multiple computing platforms.

Referring to the non-limiting example of FIG. 11, at operation 1110, an augmentation mode of a PCAR framework is activated, and an object recognition engine (for example, object recognition engine 227 in FIG. 2) is activated. Such activation may be in responses to a received input (for example, a user input). In this way, the PCAR framework is configured to recognize augmentation targets within a relevant sensor range (for example, the field of view of an externally-oriented camera, or the transmission range of a BLUETOOTH® Low Energy ("BLE") beacon on a predetermined augmentation target).

According to various embodiments, at operation 1115, the PCAR framework recognizes one or more objects as augmentation targets (for example, through comparisons of binary representations of image data patches against binary descriptors of defined features) based on image or other data provided to the PCAR. Responsive to recognizing objects that are augmentation targets, the PCAR maps the objects' location in the image data to positions with an AR field of view (for example, AR field of view 515 in FIG. 5) and displays one or more items of AR content comprising selectable overlays of the augmentation targets, and method 1100 proceeds to operation 1120. If, however, the PCAR framework does not recognize any objects, in certain embodiments, method 1100 reverts back to operation 1110. In various embodiments, when reverting to operation 1110, the PCAR framework switches back to "normal" mode, until a fresh input enabling the augmentation mode is received.

In the non-limiting example of FIG. 11, at operation 1120, a user may select

In the non-limiting example of FIG. 11, at operation 1120, a selection input is received. According to certain embodiments, the selection input selects an object associated with an overlay marker as an augmentation target to be associated with one or more pieces of AR content. According to various embodiments, selection input may be provided by a user, such as through a verbal input processed by a speech recognition algorithm implemented on an AR apparatus or device (for example, a smartphone) communicatively connected thereto. In certain embodiments, the selection input may be provided through a gaze or gesture (for example, a nod) detected by one or more sensors (for example, an internally-facing camera) of an AR apparatus. If a selection input is received by the PCAR framework (for example, within a specified period of time), method 1100 proceeds to operation 1125. If a user selection is not received, or not received within a specified period of time, method 1100 reverts to operation 1110.

In certain embodiments, at operation 1125, the PCAR framework obtains (for example, by generating a new signature, or retrieving a previously stored signature) an object signature for the object selected in operation 1120 as an augmentation target to be associated with one or more items of AR content. In various embodiments, at operation 1125, the PCAR framework also obtains (for example, by receiving user inputs, such as via option menu 820 in FIG. 8C, or from a user profile) parameters (for example, text or images to be displayed) further defining the association between the selected augmentation target and the item of AR content. At operation 1125, the object signature, and the parameters defining the association between the augmentation target and the item of AR content are provided to a PCAR management entity (for example, host platform 201 in FIG. 2).

Referring to the non-limiting example of FIG. 11, at operation 1130, the PCAR management entity (for example, a server maintaining a PCAR database) updates a PCAR database to include the association between the selected augmentation target and an item of AR content, and the parameters thereof, created at operation 1125.

FIG. 12 illustrates operations of a method 1200 for performing augmented reality-based communications according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, an electronic device.

Referring to the non-limiting example of FIG. 12, at operation 1210, a processor (for example, processor 311 in FIG. 3) obtains image data of a camera field of view (for example, camera field of view 507 in FIG. 5) from an externally-oriented camera (for example, externally-oriented camera 405 in FIG. 4).

According to various embodiments, at operation 1215, an object in the camera field of view (for example, house 502 in FIG. 5) is identified (for example, based on an analysis of binary descriptors of patches of image data, as described with reference to FIG. 7) based on the image data obtained at operation 1210.

As shown in the non-limiting example of FIG. 12, at operation 1220, the position of the object identified in operation 1215 is mapped to a position of an AR field of view (for example, the location of object frame 513 in FIGURE within AR field of view 515 is determined based on a mapping of camera field of view 507 to AR field of view 515).

According to some embodiments, at operation 1225, a determination of whether the object identified at operation 1215 is an augmentation target is performed. In certain embodiments, this determination is performed by comparing an object signature of the object identified at operation 1215 against a set of object signatures (for example, object signatures maintained in a PCAR database utilizing database schema 600 in FIG. 6). In various embodiments, the determination of whether an object comprises an augmentation target is based on whether the object belongs to a defined class of objects which can be augmentation targets (for example, non-transitory items, such as buildings or pieces of furniture).

Referring to the non-limiting example of FIG. 12, at operation 1230, responsive to determining that the object identified at operation 1215 comprises an augmentation target, an item of AR content associated with the augmentation target is displayed on an internally-facing display in the AR field of view of the AR apparatus. For example, the item of AR content may be a frame or overlay which can be selected (for example, first highlighting frame 810*a* in FIG. 8B). In certain embodiments, the item of AR content may be a pre-associated item of AR content (for example, item of content 840 in FIG. 8E).

Figure 13:
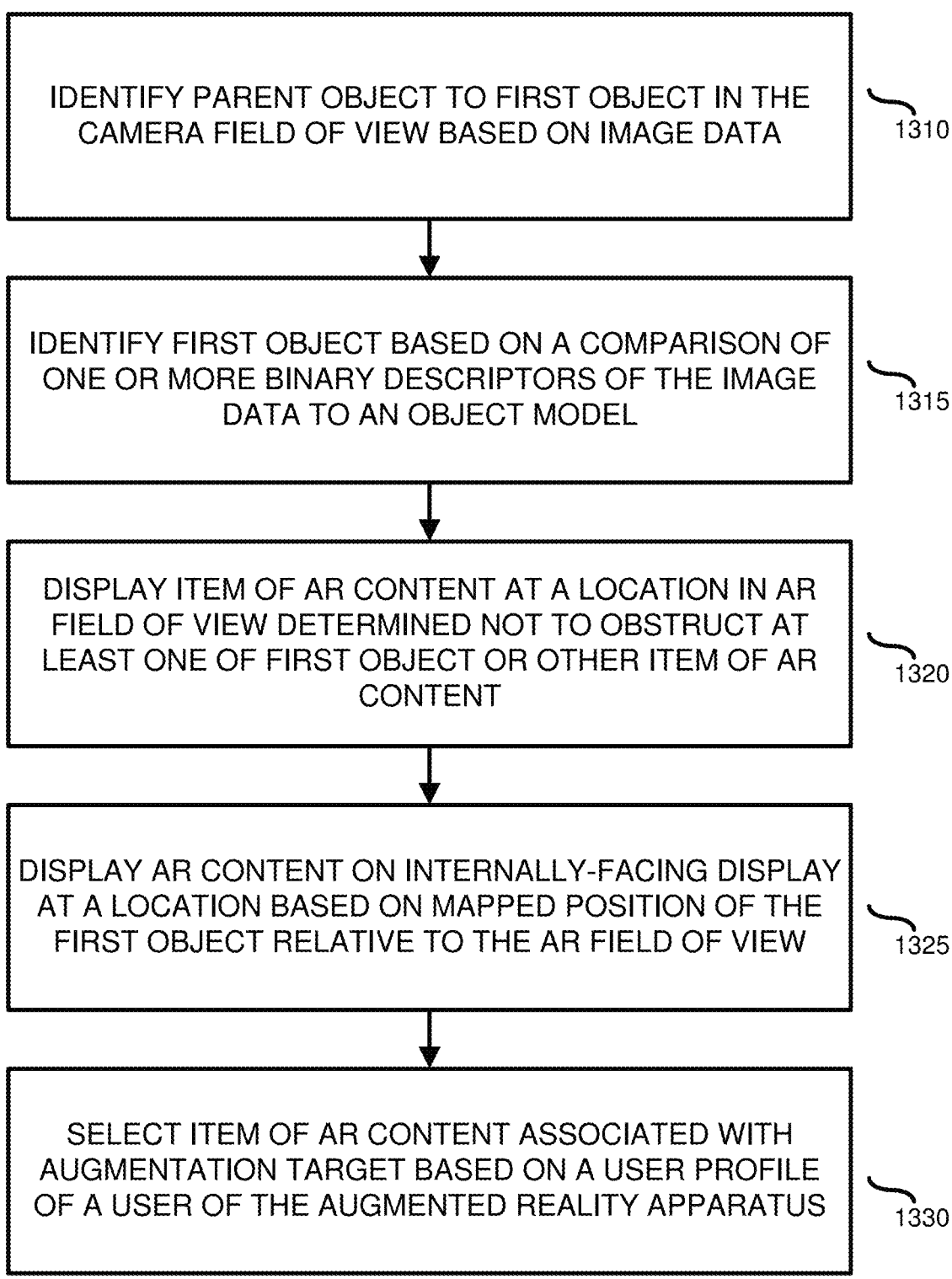
FIG. 13 illustrates operations of methods for performing augmented reality-based communications according to various embodiments of this disclosure.

FIG. 13 illustrates operations 1300 of methods for performing augmented reality-based communications according to various embodiments of this disclosure. Depending on embodiments, operations within operations 1300 may be performed in addition to the operations of method 1200 in FIG. 2, or as substitutions or alternatives to operations of method 1200. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, an electronic device.

Referring to the non-limiting example of FIG. 13, at operation 1310, a PCAR framework (for example, PCAR framework 220 in FIG. 2) or module thereof identifies, a parent object to another object in the camera field of view based on image data received from an externally-oriented camera of an AR apparatus. According to various embodiments, the PCAR framework recognizes the first object separately from its parent object (for example, the PCAR recognizes a distinctive car wheel and a car), and derives the parent-child relationship from additional information provided in a PCAR database or object descriptor database (for example, data associating a particular kind of wheel with a specific model car). According to some embodiments, the PCAR framework recognizes the first object as a feature of the parent object and based on this recognition, identifies the parent-child relationship between the objects.

In certain embodiments, the PCAR frame identifies a first object based on a comparison of one or more binary descriptors of image data representing the first object (for example, image data patch 705 in FIG. 7) against binary descriptors of features of the first object.

According to various embodiments, at operation 1320, an item of AR content is displayed at a location in the AR field of view, which has been determined not to obstruct either a view of an object which is an augmentation target (for example, house 502 in FIG. 5), or another item of AR content (for example, notification 511 in FIG. 5). In certain embodiments, the determination of non-obstructing locations within the AR field of view is based on a mapping of the locations of objects in a camera field of view to an AR field of view (for example, as performed by operation 1220 in FIG. 12). According to certain embodiments, the placement of items of AR content within an AR field of view is determined based on an analysis of the image data from the camera field of view, as well as stored contextual information regarding objects in the camera field of view. According to certain embodiments, the stored contextual information regarding objects includes information identifying the location and size of essential features of an object. In this way, items of AR content can be displayed in a way in which essential features of a scene are not occluded by items of AR content. As one non-limiting example, a movie poster which is an augmentation target may comprise the images of the actors, the film's title, and fine print identifying the studio, producers and other stakeholders in the project. The stored contextual information may include rules regarding the placement of AR content regarding the elements of the augmentation target, including, without limitation, proximity requirements for items of AR content associated with elements of the augmentation target. Additionally, the stored contextual information may include rules about feature visibility (for example, rules specifying that covering faces with AR content is impermissible, but covering text is permitted). In this way, certain embodiments according to this disclosure can present AR content associated with augmentation targets in a way that is contextually aware, and uncluttered.

In some embodiments according to this disclosure, at operation 1325, the position of an item of AR content is displayed on an internally-facing display of an AR apparatus at a location based on the mapped position of the first object relative to the AR field of view (for example highlighting frame 810*b* in FIG. 8B is displayed at a location based on the mapped position of second refrigerator 815 in the AR field of view).

In the non-limiting example of FIG. 13, at operation 1330, the item of AR content associated with the augmentation target to be displayed is selected, at least in part, based on information in a user profile of an AR apparatus (for example, second item of AR content 915*b* in FIG. 9D is, in certain embodiments, selected for display based on information in a user profile identifying a present user of an AR apparatus as a German speaker named "Lars.")

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for providing a personalized augmented reality (AR) display, the method comprising:
   obtaining, at an AR apparatus, image data of a camera field of view, the camera field of view comprising a field of view of an externally oriented camera of the AR apparatus, wherein the AR apparatus is configured to implement an AR framework, the AR framework comprising a signature engine communicatively connected to an AR database;
   identifying a first object in the camera field of view based on the image data;
   mapping a position of the first object relative to an AR field of view, the AR field of view comprising a portion of the camera field of view in which AR content can be displayed on an internally-facing display of the AR apparatus;
   generating, by the signature engine, based on identifying the first object and mapping the position of the first object, a signature of the first object, the signature of the first object comprising a unique descriptor of an identity and a physical location of the first object;
   obtaining, by the signature engine, from the AR database, a result of a comparison of the signature of the first object against signatures of objects comprising augmentation targets stored in the AR database;
   determining, based on the result of the comparison, whether the first object comprises an augmentation target, the augmentation target comprising an identified object which can be associated with an item of AR content; and
   responsive to determining that the first object comprises the augmentation target, displaying, on the internally-facing display, the item of AR content associated with the augmentation target in the AR field of view,
   wherein signatures of objects comprise a primary key (PK) of the AR database, and
   wherein the AR database comprises, for each value of the PK, a value of a user identifier (ID) of a poster of the item of AR content, a pointer to a storage location of the item of AR content, a fixed location of a target location and one or more user IDs of users with visibility permissions for the item of AR content.

2. The method of claim 1, wherein the item of AR content associated with the augmentation target comprises at least one of visual content previously assigned to the augmentation target or a user interface (UI) for assigning AR content to the augmentation target.

3. The method of claim 1, wherein the item of AR content is displayed on the internally-facing display at a location in the AR field of view based on the mapped position of the first object relative to the AR field of view.

4. The method of claim 3, wherein the item of AR content is displayed on the internally-facing display at a location in the AR field of view determined not to obstruct at least one of the first object or a second item of AR content in the AR field of view.

5. The method of claim 1, further comprising:
   identifying, based on the image data, a second object this is parent to the first object in the camera field of view, wherein the first object comprises at least one of a surface of the second object or a part of the second object.

6. The method of claim 1, wherein the signature of the first object is an encoded unique descriptor of the identity and the physical location of the first object.

7. The method of claim 1, wherein the item of AR content associated with the augmentation target is selected based on a user profile of a user of the AR apparatus.

8. An augmented reality (AR) apparatus comprising:
   an externally oriented camera covering a camera field of view, the camera field of view comprising a field of view of the externally oriented camera;
   an internally-facing display configured to provide an AR field of view, the AR field of view comprising a portion of the camera field of view in which AR content can be displayed on the internally-facing display of the AR apparatus;
   a processor; and
   a memory containing instructions that, when executed by the processor, cause the processor to implement an AR framework, the AR framework comprising a signature engine communicatively connected to an AR database, wherein the AR framework is configured to:
   obtain image data of the camera field of view,
   identify a first object in the camera field of view based on the image data,
   map a position of the first object in the camera field of view relative to the AR field of view,
   generate, by the signature engine, based on identifying the first object and mapping the position of the first object, a signature of the first object, the signature of the first object comprising a unique descriptor of an identity and a physical location of the first object,
   obtain, by the signature engine, from the AR database, a result of a comparison of the signature of the first object against signatures of objects comprising augmentation targets stored in the AR database,
   determine, based on the result of the comparison, whether the first object comprises an augmentation target, the augmentation target comprising an identified object which can be associated with an item of AR content, and responsive to determining that the first object comprises the augmentation target, display, on the internally-facing display, the item of AR content associated with the augmentation target in the AR field of view, wherein signatures of objects comprise a primary key (PK) of the AR database, and wherein the AR database comprises, for each value of the PK, a value of a user identifier (ID) of a poster of the item of AR content, a pointer to a storage location of the item of AR content, a fixed location of a target location and one or more user IDs of users with visibility permissions for the item of AR content.

9. The AR apparatus of claim 8, wherein the item of AR content associated with the augmentation target comprises at least one of visual content previously assigned to the augmentation target or a user interface (UI) for assigning AR content to the augmentation target.

10. The AR apparatus of claim 8, wherein the AR framework is further configured to display the item of AR content on the internally-facing display at a location in the AR field of view based on the mapped position of the first object relative to the AR field of view.

11. The AR apparatus of claim 10, wherein the AR framework is further configured to display the item of AR content on the internally-facing display at a location in the AR field of view determined not to obstruct at least one of the first object or a second item of AR content in the AR field of view.

12. The AR apparatus of claim 8, wherein the AR framework is further configured to:
identify, based on the image data, a second object that is parent to the first object in the camera field of view,
wherein the first object comprises at least one of a surface of the second object or a part of the second object.

13. The AR apparatus of claim 8, wherein the signature of the first object is an encoded unique descriptor of the identity and the physical location of the first object.

14. The AR apparatus of claim 8, wherein the AR framework is configured to select the item of AR content associated with the augmentation target based on a user profile of a user of the AR apparatus.

15. A non-transitory computer-readable medium comprising program code that, when executed by a processor, causes an augmented reality (AR) apparatus to:
implement, at the AR apparatus, an AR framework comprising a signature engine, the signature engine communicatively connected to an AR database, wherein the AR framework is configured to:
obtain image data of a camera field of view, the camera field of view comprising a field of view of an externally oriented camera of the AR apparatus,
identify a first object in the camera field of view based on the image data,
map a position of the first object relative to an AR field of view, the AR field of view comprising a portion of the camera field of view in which AR content can be displayed on an internally-facing display of the AR apparatus,
generate, by the signature engine, based on identifying the first object and mapping the position of the first object, a signature of the first object, the signature of the first object comprising a unique descriptor of an identity and a physical location of the first object,
obtain, by the signature engine, from the AR database, a result of a comparison of the signature of the first object against signatures of objects comprising augmentation targets stored in the AR database,
determine, based on the result of the comparison, whether the first object comprises an augmentation target, the augmentation target comprising an identified object which can be associated with an item of AR content, and
responsive to determining that the first object comprises the augmentation target, display, on the internally-facing display, the item of AR content associated with the augmentation target in the AR field of view,
wherein signatures of objects comprise a primary key (PK) of the AR database, and
wherein the AR database comprises, for each value of the PK, a value of a user identifier (ID) of a poster of the item of AR content, a pointer to a storage location of the item of AR content, a fixed location of a target location and one or more user IDs of users with visibility permissions for the item of AR content.

16. The non-transitory computer-readable medium of claim 15, wherein the item of AR content associated with the augmentation target comprises at least one of visual content previously assigned to the augmentation target or a user interface (UI) for assigning AR content to the augmentation target.

17. The non-transitory computer-readable medium of claim 15, wherein the AR framework is configured to display the item of AR content on the internally-facing display at a location in the AR field of view based on the mapped position of the first object relative to the AR field of view.

18. The non-transitory computer-readable medium of claim 17, wherein the AR framework is configured to display the item of AR content on the internally-facing display at a location in the AR field of view determined not to obstruct at least one of the first object or a second item of AR content in the AR field of view.

19. The non-transitory computer-readable medium of claim 15, further comprising program code that, when executed by the processor, causes the AR apparatus to:
identify, based on the image data, a second object that is parent to the first object in the camera field of view,
wherein the first object comprises at least one of a surface of the second object or a part of the second object.

20. The non-transitory computer-readable medium of claim 15, wherein the signature of the first object is an encoded unique descriptor of the identity and the physical location of the first object.

\* \* \* \* \*